(12) United States Patent
Spaltmann et al.

(10) Patent No.: US 11,144,686 B2
(45) Date of Patent: Oct. 12, 2021

(54) METHOD FOR SIMULATING THE INCIDENCE OF PARTICLES OR RADIATION ON AN OBJECT, COMPUTER PROGRAM THEREFOR, COMPUTER SYSTEM FOR EXECUTING THE COMPUTER PROGRAM, AND USE OF A COMPUTER

(71) Applicant: Bundesrepublik Deutschland, vertreten durch den Bundesminister für Wirtschaft und Energie, Berlin (DE)

(72) Inventors: Dirk Spaltmann, Potsdam (DE); Mathias Woydt, Berlin (DE)

(73) Assignee: Bundesrepublik Deutschland, vertreten durch den Bundesminister für Wirtschaft und Energie, Berlin (DE)

( * ) Notice: Subject to any disclaimer, the term of this patent is extended or adjusted under 35 U.S.C. 154(b) by 258 days.

(21) Appl. No.: 16/481,158

(22) PCT Filed: Jan. 26, 2018

(86) PCT No.: PCT/EP2018/051984
§ 371 (c)(1),
(2) Date: Jul. 26, 2019

(87) PCT Pub. No.: WO2018/138278
PCT Pub. Date: Aug. 2, 2018

(65) Prior Publication Data
US 2020/0019661 A1 Jan. 16, 2020

(30) Foreign Application Priority Data
Jan. 26, 2017 (DE) .......................... 102017101567.1

(51) Int. Cl.
*G06F 30/23* (2020.01)
*G06F 111/10* (2020.01)
*G06F 30/15* (2020.01)

(52) U.S. Cl.
CPC .............. *G06F 30/23* (2020.01); *G06F 30/15* (2020.01); *G06F 2111/10* (2020.01); *G06T 2210/56* (2013.01)

(58) Field of Classification Search
CPC .......... G06F 30/23; G06F 30/15; G06F 30/20; G06F 2111/10; G06T 2210/56
See application file for complete search history.

(56) References Cited

U.S. PATENT DOCUMENTS

2013/0030762 A1* 1/2013 Mercier ............... A61N 5/1031
702/179

FOREIGN PATENT DOCUMENTS

| DE | 69113465 T2 | 5/1996 |
| DE | 102008031526 A1 | 4/2009 |

OTHER PUBLICATIONS

Rieffel et al. "Performance Modeling for Concurrent Particle Simulations" [thesis] California Institute of Technology [retrieved on Jun. 1, 2021] (Year: 1998).*

(Continued)

*Primary Examiner* — Rehana Perveen
*Assistant Examiner* — Alfred H B Wechselberger
(74) *Attorney, Agent, or Firm* — Bachman & LaPointe, PC; George Coury

(57) ABSTRACT

The invention relates to a method for simulating an impact of particles/radiation on an object: (a) Providing a control memory including control memory locations and a mass memory including mass memory locations. (b) Building a simulated particle/radiation unit, wherein this particle or the radiation unit is designated for impact on the object. (c) Defining at least one property/energetic state of a particular, individual particle/radiation unit. (d) Carrying out a simulated impact of the particular individual particle/radiation unit on the object, wherein a distribution function of an impact site and/or of a velocity of the particular individual particle/radiation unit is used. (e) Determining or querying at least one local property and/or a local energetic state of at least one affected object element. (f) Determining or querying a collision event caused by the impact and acting on the individual particle/radiation unit and/or the affected object element or volume element. (g) Determining a consequence of the collision event at least on the affected volume element or object element. (h) Storing a newly determined or an unchanged control data value in the corresponding control memory location and a newly deter- (Continued)

mined or unchanged mass data value in the corresponding mass memory location.

17 Claims, 6 Drawing Sheets

(56) References Cited

OTHER PUBLICATIONS

Scheckler et al. "An Efficient Volume-Removal Algorithm for Practical Three-Dimensional Lithography Simulation with Experimental Verification" IEEE Transactions on Computer-Aided Design of Integrated Circuits and Systems, vol. 12, No. 9 [retrieved on Jun. 1, 2021] (Year: 1993).*

Wada et al. "Numerical simulation of impact cratering on granular material" Icarus, vol. 180, pp. 528-545 [retrieved on Jun. 8, 2021], (Year: 2006).*

Ciampini et al., "A Cellular automata and particle-tracking simulation of abrasive jet micromachining that accunts for particle spatial hindering and second strikes", Journal of Micromechanics & Microengineering, vol. 20, (2010), pp. 1-16.

Mora, "Lattice Monte Carlo modeling of solid particle erosion", DFG-Project Schm 746/135-1, (2014), XP055477070.

Nicholls, "Monte Carlo modelling of erosion processes", Elsevier, WEAR, School of Industrial and Manufacturing Science, Cranfield University, Cranfield, Bedford MK43 OAL, UK, (1995) pp. 64-77.

International search report for patent application No. PCT/EP2018/051984 dated May 23, 2018.

\* cited by examiner

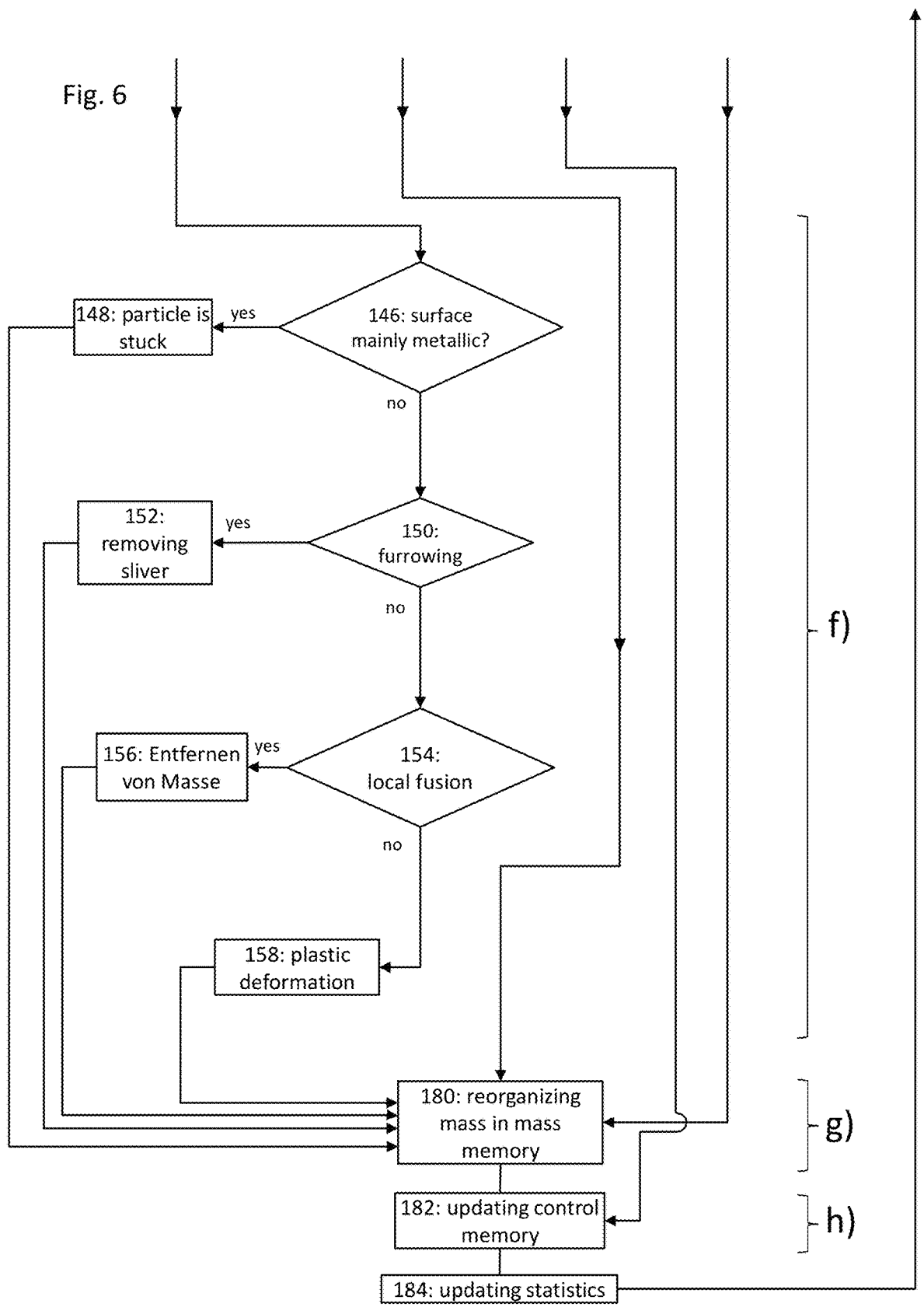

METHOD FOR SIMULATING THE INCIDENCE OF PARTICLES OR RADIATION ON AN OBJECT, COMPUTER PROGRAM THEREFOR, COMPUTER SYSTEM FOR EXECUTING THE COMPUTER PROGRAM, AND USE OF A COMPUTER

BACKGROUND OF THE INVENTION

The present invention relates to a simulation method for simulating the impact of particles or of radiation on an object of the type in question. Such simulations methods are used, for example, to predict possible damage, abrasion, the deposition of matter and/or other consequences of particles or radiation acting on an object. For example, the effects of ash and/or dust particles on (aircraft) turbine blades can be examined using such a simulation method.

In general, a number of simulation methods are known for representing physical and/or chemical processes, without the need to conduct actual experiments. For example, using such simulation methods, it is possible to predict mechanical stresses on components, or the failure thereof, with sufficiently high precision and without extensive material expenditure or jeopardizing a test environment. In particular, what is known as the finite element method (FEM) has been shown to be suitable for simulating physical processes.

A key logical component of the FEM is that a body is modeled based on different sub-bodies having a simple shape, wherein these sub-bodies are interconnected via nodes, and forces and/or displacements are transferred between the sub-bodies at these nodes. In particular, general conditions, trial functions with parameters, and the like, are used in the process. The advantage of this method is that it allows complex systems to be represented in good approximation.

The FEM is also suitable for simulating the impact of particles or of radiation on an object of the type in question. For this purpose, the object of the type in question on which a particle or radiation is to impact is modeled based on defined elements, and bombarded with a particle, which is possibly composed of elements, or a radiation unit. Hereafter, the effect of such an impact on the finite element or elements at the site of impact will be determined based on the laws of physics, and the resulting consequences on the collectivity of the simulated elements of the object will be examined. The finite elements, which are assembled to form the object to be simulated, form a mesh with the nodes thereof. If one of these nodes is displaced, the effect thereof on the collectivity of the elements must be calculated each time, even if only one node shifts.

Furthermore, what is known as the discrete element method (DEM) may also be used, wherein the object to be simulated is composed of a large number of particles. Analogously to the FEM, these particles or discrete elements are the modeling elements. Each of these discrete elements must be assigned an initial position and an initial velocity. If one of these discrete elements moves, the resultant effect on all other particles must be calculated.

The previously known solutions, and the finite element method in particular, have very complex designs regarding the underlying mathematics and require considerable computing complexity.

SUMMARY OF THE INVENTION

It is therefore an object of the present invention to provide a simulation method which has a simple and robust design and is characterized by a low need for processing power of a computer for executing a computer program of the simulation method according to the invention.

The above object is achieved by a method, by a computer program, by a computer system according to claim 14, and by the use of such a computer system all disclosed herein.

The method for simulating an impact of particles or radiation on an object comprises the following steps. The embodiments or designs described under the respective steps are in general optional and may be added to the respective step or be omitted. Essentially only the content of the respective steps is relevant for achieving the object.

Step a): Providing a control memory comprising control memory locations and a mass memory comprising mass memory locations. Each mass memory location is assigned a control memory location, so that the mass memory location, together with the assigned control memory location, describes a particular volume element. The collectivity of the volume elements thus forms the simulation volume. Moreover, at least one control data value is stored in each control memory location, and at least one mass data value is stored in each mass memory location.

In particular, a rigid simulation volume is set up by the volume elements, wherein the volume elements are designed so as to be rigid with respect to one another. The wording "rigid" here shall be understood to mean that the individual volume elements are to be considered as compartments, conceivable as compartments of a shelf, for example, disposed in a fixed manner with respect to one another, which can be provided with mass or mass having properties. A displacement of individual volume elements does not take place.

The mass data value stored in a mass memory location indicates whether and/or how much mass is present in a corresponding volume element. Consequently, a mass memory location, together with the corresponding mass data value, represents a volume element of the type in question which includes matter. The mass-containing volume element becomes an element of the object to be simulated, hereafter referred to as an object element, in particular when this association with the object was established in the related control memory element. Together, the collectivity of the object elements forms the simulated object, which has defined geometric dimensions and defined properties. In particular, this means that the present method requires specific modeling of a sufficiently determined object.

These properties are represented by the control data value in the associated control memory location of the control memory. For this purpose, the control data value indicates, for example by way of element type information, which component of the object the corresponding volume element or object element is to be considered part of. For example, if the object is composed of different components, such as a base material including a coating and paint applied thereto, the control data value accordingly indicates whether the mass present in the respective volume element, or the object element, belongs to the 'base material', 'coating' or 'paint' component. In this way, it would be possible to track, for example, how parts of a base material of the object would be removed in one location by particle erosion and deposited in another location on the coating and/or paint.

Furthermore, the control data value can include a particular element property that the volume element or object element has and/or reflects information about an energetic state of a respective volume element or object element. In particular, the control data value can include a plurality of pieces of information about the accordingly simulated volume element or object element, such as object association/component (element type), material properties, an event history and/or a temperature.

The geometric dimensions of the object are represented by the volume elements being accordingly occupied with mass. In particular, these geometric dimensions of the object are determined by the preset edge length of the individual, in particular cube-like, volume elements which are occupied with mass, but also by which and how many volume elements were marked as objects by way of the control memory.

Preferably, the control memory essentially has the same number of memory locations as the mass memory, wherein a particular control memory location is assigned to each mass memory location. The wording "essentially" is used to clarify that while, for example, homogeneous, and possibly invariable, regions of the simulation volume can be represented based on a multitude of mass memory locations, fewer control memory locations are required to do so. In this way, a multitude of mass memory locations would be assigned to at least one control memory location.

In principle, it shall be noted that, within the meaning of the present invention, the term "memory location" shall be understood to mean that this is suitable for storing a piece of information, in particular in digital form. In the present context, the control memory or the mass memory is designed in such a way, and includes such a number of control memory locations or mass memory locations, that the control data values and mass data values needed for the simulation can be received and stored.

According to an alternative aspect of step a) of the invention, the simulation volume and the object simulated therein are formed by the provision of a single simulation memory. The simulation memory is designed analogously to the above-described step a) with control memory locations and mass memory locations in such a way that a mass memory location, together with the assigned control memory location, describes a particular volume element, wherein the collectivity of the volume elements forms the simulation volume. Moreover, by storing at least one control data value in each control memory location and at least one mass data value in each mass memory location, it is achieved that the object association/component (element type), a particular element property and/or an energetic state of a respective volume element can be indicated for the corresponding volume element, and the mass data value represents at least a presence and/or the amount of mass in the respective volume element in such a way that the collectivity of the volume elements thus provided with mass are considered to be object elements that, together, form the simulated object having defined geometric dimensions and defined properties. The properties of the mass memory and of the control memory described hereafter also apply to the alternative embodiment of the simulation memory, where applicable. Put more simply, it is possible for the simulation memory to be provided by a combination of the mass memory and the control memory.

In the case of a cube-shaped simulation volume and/or of an orthogonally oriented simulation volume having three spatial dimensions, a "cube-shaped" mass memory and a likewise "cube-shaped" control memory would consequently have to be provided, wherein the cube shape placed between the quotation marks is used to indicate the logical structure of the mass memory or of the control memory, instead of indicating a spatial, geometry design. In the case of a cube-shaped simulation volume—described by a Cartesian coordinate system—the individual volume elements of the simulation volume would be indicated by a 3-tuple comprising X, Y and Z coordinates. For example, the Z coordinate can reflect a respective plane of a volume element, the Y coordinate can reflect a row of the volume element, and the X coordinate can reflect the position of the volume element in the respective row.

In this way, a control memory location and an associated mass memory location can thus be assigned to a particular volume element by way of a 3-tuple. In this way, a 3-tuple can be used to identify a specific volume element or object element, wherein reference is also made with this to the assigned mass memory location in the mass memory and to the assigned control memory location in the control memory. This applies analogously to the design of the alternative, above-mentioned simulation memory, where applicable.

In particular, the simulation volume can be composed of cubes or cuboids, wherein the edge length of the cubes is the smallest simulation unit, and wherein a cube represents a volume element or an object element. In any case, properties within a cube are assumed to be constant, for example the density, temperature, nature of the material, and the like, of an object—represented by a volume element provided with mass—are constant across the cube of the object element.

The edge length of a volume element, that is, of the simulation cube representing a volume element, is thus the determining size for the simulation. If, for example, the edge length of a cube is 20 µm, and this is to be used to build up a simulation volume having the dimensions of 5 mm×5 mm×2 mm, this space comprises 250×250×100 cubes in the X, Y and Z directions and is composed of 6.25 million volume elements.

According to one embodiment, the control data value includes compressed technical information, so that multiple mutually independent technical details of the volume element or object element described thereby can be derived from one control data value. In particular, this compression or derivation of multiple technical details from a control data value is carried out by way of a defined compression or derivation rule. Such a step allows the size of the control memory to be kept small, and means that a number of technical details of a volume element or of an object element does not result in a multiplication of the necessary control memory locations according to the number of the technical details.

According to one embodiment, the individual technical details are stored in the control data value by using prime numbers or by saving a product of prime numbers, wherein each individual prime number represents a certain technical detail. If, in the course of the simulation method, technical details—such as technical properties and/or information about an energetic state—of a volume element or of an object element are queried, the control data value is broken down into the prime numbers thereof, or the control data value is divided by the corresponding prime number, using the modulo operation, during the query for properties. In this way, it is possible to read out different technical details from a control value.

So as to illustrate this principle, without limiting the scope, a simulation object comprising a base material and a coating is introduced, and an exemplary volume element provided with mass, thus an object element, is described. This object element shall belong to the base material of the object, shall be made of a metallic material, shall exhibit a property X and a property Y, and shall have a particular energetic state Z. The following exemplary allocation list is used in the process, which has found to be sufficient for simulating the erosion of a metallic object by ceramic particles. A different assignment may be advantageous for simulating other processes.

Control memory element=1: the associated volume element is empty and thus is not considered to be an object element;

Control memory element dividable by 2 without remainder: the mass in the associated volume element, which is now considered to be an object element, belongs to the base material of the object;

Control memory element dividable by 3 without remainder: the mass in the associated object element belongs to the coating of the object;

Control memory element dividable by 5 without remainder: the mass in the associated object element belongs to a particle that has become stuck in the object;

Control memory element dividable by 7 without remainder: the mass in the associated object element is a metal;

Control memory element dividable by 11 without remainder: the mass in the associated object element is a ceramic material;

Control memory element dividable by 13 without remainder: the mass in the associated object element belongs to a particle having a predominantly round geometry that has become stuck in the object;

Control memory element dividable by 17 without remainder: the mass in the associated object element belongs to a particle having a predominantly angular geometry that has become stuck in the object;

Control memory element dividable by 19 without remainder: the mass in the associated object element has already been hit once; in principle, multiple hits are possible and provided. This is represented by how often the number is dividable by '19'.

Control memory element dividable by 23 without remainder: the mass in the associated object element exhibits the property X;

Control memory element dividable by 31 without remainder: the mass in the associated object element exhibits the property Y;

Control memory element dividable by 37 without remainder: the mass in the associated object element has the energetic state Z.

Corresponding to this assignment, the control value of the exemplary object element, volume element, would be the product of 2, 7, 23, 31 and 37, thus 369,334.

According to one embodiment, the principle of data compression by way of prime numbers can also be applied to the type of individual processes to be carried out during the simulation method, the determination of the shape of possible erosion particles, and also to the selection of different simulation models.

In particular, however, it is also possible to use one and the same prime number multiple times, but in each case only once in these different regions of the simulation object, as long as these regions are independent of one another. The aforementioned exemplary assignment would have to be revised accordingly in this case.

According to further embodiments, further compression rules can be provided. For example, properties or the history of a volume element described thereby with respect to preceding particle hits can be stored or read out, using a binary system:

| Position/power . . . | 4 | 3 | 2 | 1 | 0 |
|---|---|---|---|---|---|
| Value (0/1): . . . | 1 | 1 | 0 | 1 | 1 |
| Power of 2: . . . | $2^4$ | $2^3$ | $2^2$ | $2^1$ | $2^0$ |
| Result of the power: | 16 | 8 | 4 | 2 | 1 |
| Number in the control memory location: | $1 \cdot 16 + 1 \cdot 8 + 0 \cdot 4 + 1 \cdot 2 + 1 \cdot 1 = 27$ | | | | |

The position/power is assigned a property, such as:
[0] information about the presence of mass in the specific volume element, wherein the value "0" can denote that no mass is present, and the value "1" can denote that mass is present, that is, the volume element is an object element;
[1] presence of a coating, that is, whether the object element is part of a coating, wherein the value "0" can denote "object element is base material" and the value "1" can denote "object is coating";
[2] material type of the object element, wherein the value "0" can be assigned to ceramic material and the value "1" can be assigned to metal material;
[3] history, that is, documentation of preceding hits by particles or radiation units at this location, wherein the value "1" can denote a preceding strike and the value "0" can denote no preceding strike;
[4] documentation - analogously to 3 - of the 2-time hits, wherein the value "1" can denote two preceding hits and the value "0" can denote no two preceding hits.

In the above example, the number '27' would mean that, in this location, the object is made of metal, is part of a coating and has been hit twice at this location.

According to a further embodiment, words and/or contiguous strings can be used to store properties and/or the hit history. The principle is the same as with the numbers. For example, the first letter in the word/string can denote the object material, the second can denote the coating, the third the number of previous hits and the like. Since there are 26 letters in the alphabet, each position can assume 26 values. In this way, a more detailed distinction of the materials can be made (hard metals, glasses, plastic materials and the like). The number of hits then reaches up to 26.

Step b): Building—that is, defining and setting up in the program—a simulated particle or a radiation unit, wherein this particle or the radiation unit is designated for impact on the object. In this connection, it is clarified that this also encompasses that the object impacts on the particle or on the radiation unit (such as aircraft turbine blade). What is relevant here is that the object meets with the radiation particle or the radiation unit as a result of the relative velocity with respect to one another and colliding trajectories, thereby possibly an interaction taking place. The wording "interaction" "or "interact" used hereafter represents such a meeting of the object and particle or radiation unit, regardless of whether, according to the simulation, an actual interaction takes place or whether the meeting remains without a simulated consequence. In principle, this could also be referred to as a bombardment of the object with the particle or the radiation unit. Step b) thus prepares a simulated particle or a simulated radiation unit by determining at least one basic property and/or an energetic state of the particle or of the radiation unit, or by querying at least one basic property and/or an energetic state of the particle or of the radiation unit from a predefined memory by way of a corresponding program routine.

For example, such properties could describe the density, hardness, modulus of elasticity, fracture toughness, basic information about the geometric shape—for example, whether sharp-edged, round—of a particle, or an energetic state, the temperature of a particle or the frequency and/or amplitude of a radiation unit.

According to one embodiment, in step b) a plurality of designated particles and/or radiation units is created, for example different classes of designated particles and/or radiation units, wherein the assigned property and/or an energetic state are the same for the plurality of designated particles and/or radiation units.

Possibly, such properties or pieces of information about the energetic state corresponding to material information or a material selection are read out from a database or are individually provided by the user during the start of the program.

In principle, suitable storage means and/or memory locations are provided for carrying out step b).

Step c): Since according to step b) fundamental, and in particular shared, properties regarding the interaction or the impact of at least one designated particle or radiation unit are determined, according to step c) at least one property and/or an energetic state of a particular, individual particle or of a particular, individual radiation unit are defined. The wording "particular, individual particles" or "particular, individual radiation unit" is intended to clarify that this is a specific, known and identifiable individual particular or individual radiation unit, which in this specific embodiment within the scope of the simulation is to collide with the simulation object, and consequently interacts therewith.

Put more simply, since in step b) the fundamental shared properties, that is, the type of an individual particle or individual radiation unit, are determined and established, in step c) the individual particle or individual radiation unit considered for the next impact is identified, determined and/or established with respect to all necessary information.

According to one embodiment, step b) and step c) can be carried out together.

According to one embodiment of step c), at least a volume, possibly a present location, a velocity, a temperature and/or a charge are assigned to the particular individual particle, or a frequency and/or an amplitude are assigned to the particular individual radiation unit.

According to one embodiment, the individual particle as well as the simulation volume are composed of individual particle elements, so that a plurality of particle elements together represents the individual particle according to the desired geometric properties.

If, for example, a sphere-like individual particle having a diameter of 100 μm is to be generated, wherein an edge length of the predefined particle elements, possibly equal to the edge length of the volume elements, is 20 μm, the individual particle would include five individual particle elements at the maximum diameter.

So as to be able to simulate a realistic particle jet stream, the method step of the particle definition can be combined with a suitable distribution function, so that the sizes of the generated individual particles vary by the predefined value of the particle size according to a desired distribution, for example according to a normal distribution. In particular, the individual particle can be selected using a random function or according to a suitable rule from previously defined particle classes having a respective defined particle property.

Step d): Carrying out a simulated impact of the particular individual particle or the particular individual radiation unit on the object, wherein a distribution function of an impact site and/or of a velocity of the particular individual particle or of the particular individual radiation unit is used. This is carried out in such a way that at least one object element hit by the individual particle or by the individual radiation unit is identified in the simulation volume, and that a property and/or an energetic state of the individual particle or of the individual radiation unit during the impact on the object can be determined or queried. In this way, all relevant pieces of information and properties of the individual particle or of the individual radiation unit at the point in time and site of the collision are known, whereby thereafter consequences from the collision can be estimated and/or determined.

The use of a statistical approach, and in particular the use of distribution functions, means a considerable simplification of the simulation method since a complicated, exact determination of a process or state simulating reality is not needed, but specific information about the individual particle or about the individual radiation unit is based on statistical assumptions, whereby deviations are statistically compensated for via the plurality of interactions that occur with the object.

In particular, an impact region can be defined in addition to the impact site, wherein the impact site defines the exact localization of the collision between the particle and the object, and the impact region describes a region in which object elements are affected by the collision.

Step e): Determining or querying at least one local property and/or a local energetic state of at least one affected object element. The site of the collision determined by way of step d) is consequently examined with respect to the ambient circumstances and conditions prevailing there. For example, the corresponding control memory location of the hit object element is consulted for this purpose. As a result, at this point in time of the simulation, all relevant information of the object element hit by the individual particle or the individual radiation unit is available.

Step f): Determining or querying a collision event caused by the impact and acting on the individual particle, the individual radiation unit and/or the affected object element or volume element. The term "collision event" is intended to illustrate that, in the determination or in the provision of the information considered for the query, models are used which at least approximately reflect the real process of the individual particle or of the individual radiation unit impinging on and in the object. As a result, physical calculation rules are used in the process so as to be able to simulate the collision as realistically as possible.

According to one embodiment of step f), calculation models for the determination of an impact force and/or of a penetration depth of the particle or of the radiation unit into the object are used for this purpose. In particular, specific, local properties within the contact zone between the individual particle and the object surface can be ascertained. The contact zone influenced by the interaction between the individual particle and the object can be ascertained by way of the dimension of the particle, taking the penetration depths of preceding events into consideration.

In particular, the formula for calculating the penetration depth of a projectile into an object determined by Forrestal may be used (International Journal of Impact Engineering, 1995, vol. 16, p. 699-710: M. J. Forrestal, D. Y. Tzou, E. Askari, D. B. Longcope "Penetration into ductile metal targets with rigid spherical-nose rods"):

$$p = \frac{2}{3} \times \left(\frac{\rho_P}{\rho_S}\right) \times \left(L + \frac{2 \cdot a}{3}\right) \times \ln\left(1 + \frac{3 \cdot \rho_S \cdot v_i^2}{4 \cdot A}\right), \text{ where}$$

$$A = \frac{2}{3} \times Y \times \left[1 + \ln\left(\frac{2 \cdot E}{3 \cdot Y}\right)\right],$$

and "p" is the penetration depth, "L" is the length of the individual particle with respect to the direction of movement thereof, "a" is the radius of the individual particle, "pp" is the density of the individual particle, "ps" is the density of the object, "E" is the modulus of elasticity of the object, "Y" is the yield strength of the object, and "$v_i$" is the velocity of the individual particle. The use of this model for calculating a penetration depth is suitable, in particular, when the material of the object at the impact site is metallic, and moreover in particular when an individual particle is made of ceramic material and a metallic object is present.

According to one embodiment, the person carrying out the simulation and/or possibly appropriately designed failure software of the simulation program can select from different available calculation models so as to determine the collision event in the best possible manner.

If an, in particular brittle, particle impacts on an object made of likewise brittle material, such as in the case of a ceramic material, a model for the crack formation in the impact region can be used in connection with the determination of an impact force in relation to a threshold force. The impact force of the particle on the object can be calculated as follows, wherein further suitable models can also be employed for describing brittle materials:

The impact force of the particle on the object is calculated as follows:

$$F_i = c_1 \cdot v_i^{4/3} \cdot \left(\frac{D}{2}\right)^2,$$

where $c_1$ is a material constant of the material at the impact site of the object and is composed according to $$c_1 \cong 2 \cdot \pi^{2/3} \cdot H_S^{1/3} \cdot \rho_P^{2/3}, \text{ where}$$

"$v_i$" denotes the impact velocity of the individual particle, "D" denotes the diameter of the particle, "$\rho_P$" denotes the density of the particle and "$H_S$" denotes the hardness of the material (Journal "Wear," 1999, vol. 233-235, p. 436-443: M. A Verspui, G de With, A Corbijn, P. J Slikkerveer Verspui-Wear, "Simulation model for the erosion of brittle materials, Original Research Article").

If it is determined that a brittle object interacts with a particle, the impact force is calculated and compared to the threshold force. If the impact force exceeds the threshold force, a size of a resulting crack in the object is calculated, wherein this crack may have a crescent-shaped configuration. According to the size of the crack, the mass to be removed is determined, which can be knocked out of the material due to the crack. If this calculated, knocked-out mass drops below a minimum value, it is assumed that no loss of mass of the object due to break-out is taking place, and that the individual particle bounces off without effect. In particular, the minimum value for the knocked-out mass may be based on the smallest value considerable by the simulation program, for example 0.1 pg/µm³ (one tenth of a picogram per cubic micrometer).

According to one embodiment, it is then stored in the control memory that the hit object element was already hit, resulting in weakening of the corresponding object element. In principle, a query may be launched in the case of the presently impinging individual particle as to whether the presently hit region already had to suffer a hit. In this case, these pieces of information cause the threshold force of the respective object element to be re-calculated, adapted and/or reduced based on the prior material weakening. In the case of a repeated impact, a lower impact force may thus cause mass to break out due to the lower threshold value.

In addition to the direct properties, the control memory also stores the history, that is, the collision events of the particle erosion of a volume element which have already taken place, in particular inasmuch as and to the extent that the properties of the respective material of the object were changed thereby. This is important, for example, in the case of metals that may experience hardening from the collision with particles. In the case of ceramics, the threshold at which damage occurs can be lowered by repeated collisions with particles.

According to one embodiment of step f), a simulation-specific causality logic is used for determining the collision event, wherein different decisions that are relevant for the determination of the collision event can be made based on a number of criteria to be queried.

For example, during the course of the simulation, for example in advance at the start of the simulation or in the context of the interaction with the object, it is queried whether a metallic material or a ceramic material of the object is present at the impact site. The causality logic would be structured in this case in such a way that, when a metallic material or a metallic collision partner of the ceramic particle is present, a model for calculating the penetration depth, for example as described above, would be used. Due to the elasticity of a metallic material, the individual particle would penetrate at least in part into the metallic object.

If the query of the causality logic shows that the collision partner or the object exhibits brittle behavior at the impact site, for example due to the presence of a ceramic material there, a model for crack formation would be employed.

Step g): Determining a consequence of the collision event at least on the affected volume element or object element, and in particular on the affected volume elements or object elements. In detail, this takes place based on a determination or new determination of the respective control data value and of the respective corresponding mass data value of the hit volume element or object element, wherein a change of a respective mass, of a respective element property and/or of an energetic state is taken into consideration.

This means a considerable simplification of the consideration of the physical processes actually taking place since, in particular, only changes or possibly non-changes of a respective mass, of a respective element property and/or of an energetic state are focused on. Furthermore, the establishment of changes or of non-changes is based on the theoretical results from step f), wherein the change or non-change can be inferred quantitatively based on the findings about the collision event according to the causality logic.

According to an alternative embodiment, step f) and step g) can be carried out together. For example, is possible that, according to the causality logic, suitable models are used for determining the effect and consequence of the collision, and, using this result, a change or non-change of the mass and/or property of the hit object element is re-determined.

According to a further embodiment, it is possible that, according to the causality logic, steps f) and g) can be repeated several times, and in particular that the two steps can be mutually dependent.

Specifically, what was described above can mean, for example, that a penetration depth of the individual particle into a metallic object is calculated. The theoretical penetration of the individual particle into the object can be understood as the actual, realistic event. Hereafter, a crater formation on the object is inferred from this penetration depth. In the simulation volume, the crater formation manifests itself as a removal and relocation of mass, that is, as a displacement of mass, from one volume element into another volume element. The systematic nature of the displacement takes place by way of predefined models. In this case, for example, mass would be removed from the object in the region of the collision or in a projection region of the particle, and relocated in an edge region of the cater—the distance from the center of the collision is greater than a projected surface area of the particle—in the form of a mound.

The advantage regarding the calculation complexity will be disclosed based on the present example, which shall not be construed to have a binding effect: To establish a consequence of the particle collision, all that is necessary—without being restricted thereto—is to simply calculate a theoretical penetration depth and to infer therefrom the consequence based on simplified event models. A detailed analysis of interactions between individual object elements, as is necessary with methods according to the prior art, for example regarding a transfer of forces, is not needed.

According to one embodiment, binding forces between the volume elements or between object elements may be considered. For example, attracting forces between individual object elements can cause material having particular properties to preferably deposit, or not to deposit, in the region of other materials having compatible properties.

Moreover, it is possible that, according to one embodiment, the temperature of volume elements or of object elements is taken into consideration, and in particular, that the related changes in the material properties are incorporated in the determination of the collision event.

For example, if the individual particle and the material of the object have different temperatures at the impact site, a transfer, for example a related change, of the temperatures could be considered within the meaning of a further embodiment. In particular, it would be possible to configure program routines designed for this purpose for transferring temperatures.

According to one further embodiment, the transfer of the temperature can be considered by way of a further storage unit, in particular an energy memory, possibly comprising a control memory, including energy memory locations, in particular analogously to the mass memory and control memory. The energy Q in Joule stored there can be converted via the mass m from the mass memory by way of the material property 'heat capacity' c into a local temperature, for example according to $Q = c \cdot m \cdot \Delta T$. Using suitable physical models, it is also possible to simulate temperature transfer phenomena.

According to a further embodiment, an additional energy memory comprising energy memory locations can also be provided, in which stresses in the material can be stored and reproduced. By way of this additional energy memory—possibly comprising a corresponding control memory—it is possible to simulate phenomena that occur with friction of particles on object surfaces.

In particular, the mass principle described below and a respective mass and control memory can be employed for simulating the friction itself. So as to likewise be able to describe stress phenomena that occur with friction, the use of an appropriate energy memory is proposed.

According to one embodiment, the method according to the invention does not include a step in which displacements and/or forces are passed on from one element to the adjoining element via nodal points between volume elements or object elements. In particular, no differential equations are solved during the method to be able to determine an interaction between individual elements. Moreover, in particular, the method according to the invention is not based on the basic principle of the FEM, wherein geometric structures can be simulated based on defined elements, and external influences on this geometric structure can be examined with respect to the consequence thereof by analyzing interactions between the individual elements.

In contrast to the methods according to the prior art, and in particular the DEM, according to one embodiment of the simulation method a memory space is created, which has an organizing function, but itself does not have a geometric function. Insofar it is not possible to refer to discrete or finite elements. According to the invention, geometric shapes can be represented by occupying the mass memory with mass. Interactions between individual mass portions take place by way of nearest neighbor analyses, described hereafter, and/or by way of the control memory. If, in particular, the mass portion is a ceramic, different interactions are triggered than when a metal is present.

According to one embodiment, distance considerations between individual mass portions do not play a role. Due to the organizing function of the mass memory, these distances are always the same and also cannot be changed. According to an optional embodiment of the simulation program, as a result no mechanical stress build-up within an object is simulated. However, it is possible to implement this by adding an energy memory.

The volume elements of the mass memory themselves are stationary, rigid and cannot be moved. Only the mass portions present therein can be reorganized. The values of these mass portions can range between zero and a maximum upper limit. This upper limit depends on the dimensions of a storage compartment/element and the density of the material to be simulated.

What was said above applies, analogously, also to the presence of a brittle, inelastic object, and in particular in the case of a ceramic material at the impact site or in the impact region of the object, wherein calculation models and logical decision structures are designed in keeping with the object.

Step h): Saving a newly determined or an unchanged control data value in the corresponding control memory location and a newly determined or unchanged mass data value in the corresponding mass memory location. If, for example, the mass from volume elements was removed by the collision, a change of the corresponding mass memory location takes place in such a way that the volume element is represented as being without mass, and thus empty. If the previous volume element was characterized as belonging to the object, having a mass present, that is, as an object element, as a result of the collision this consequently becomes a volume element having no mass and having no particular identification.

According to one embodiment, steps d), e), f) and g) are carried out chronologically after steps a) and b), and in particular after step c). In this way, a particularly efficient simulation process is ensured.

According to an advantageous embodiment, in a step i), in particular in the course of carrying out step b), a plurality of designated particles or radiation units are build, wherein a simulation goal is determined in a step j).

According to one embodiment, the simulation is designed in such a way that the individual collisions of individual particles or individual radiation units on the object are processed in a simplified step-based method. In particular, an interaction of the particular individual particles in the jet stream among one another can be neglected.

According to one embodiment, an interaction between the particles may still be considered. Since the method allows the individual particles to impact on the surface of the object based on a distribution function, the distribution function can also indicate a distribution of the particles after the interaction thereof or taking a particle/particle interaction into consideration.

According to one embodiment, the simulation goal can be defined by determining a total number of individual particles or individual radiation units, a total mass of the individual particles, a total radiation dose of the radiation units and/or by determining the extent of damage to the object to be achieved by the simulation, wherein the extent of damage is established as a loss of mass or a gain of mass and/or a degree of material removal or material deposition of the object.

According to a further embodiment of the simulation method, at least steps c), d), e), f), g) and h) are repeated until the simulation goal is achieved. In this way, a quantitative simulation result can be achieved by way of the simulation, wherein statistical outliers in consequences of the real events are compensated for by the number of simulation runs. As a result, the simulation result greatly approximates a real particle or radiation interaction with an object, in particular by virtue of collision.

Moreover, the result of each simulated interaction or collision is stored in the mass memory and in the control memory, so that interim results of the simulated collision that has been carried out can be queried. For this purpose, for example, interim results and/or simulation processes, entire or partial copies of all memories, either in original or edited form, can be stored for subsequent analysis. These interim results are represented by physical quantities in SI units, such as loss or gain of mass in kilograms or in milligrams, the change of the geometric structure of the object in meters or in micrometers, square meters and/or cubic meters.

According to one embodiment, the simulated interaction does not progress according to a time duration, but according to a particular number or a particular mass of individual particles, of a predefined damage profile, such as a change in volume or mass. The simulation method is not a time-based simulation using time intervals of $\Delta t$, but is step-based. It is irrelevant how much time is spent on such a step in reality. If, for example, a real experiment using 100 g erosion particles takes approximately 10 minutes, the impinging mass can subsequently be transformed into a timeline. The simulation method itself does not specify any times. However, the simulation method can store the current starting point of the simulation (date, time), just as it tracks the time that has passed during the simulation/that was needed for the simulation.

The method according to the invention makes it possible for the first time to simulate an erosion process, that is, a highly quantitative interaction of an object with particles and/or radiation, efficiently and, according to different requirements, flexibly, without resulting in excessive computing complexity and the associated costs and time expenditure. For example, the simulation of a single colliding particle by way of the FEM, using 100,000 nodes on a commercially available personal computer (4 GB Quad CPU 2.66 GHz) takes as long as 15 minutes. In contrast, the method according to the invention carries out a simulation of 10,000,000 impinging particles on an object, having 62,500,000 object or volume elements, in 15 minutes. The method according to the invention is consequently faster than methods according to the prior art by orders of magnitude. In contrast to the FEM and the DEM, the method according to the invention is able to consider collision events in a locally delimited manner. Regions of the object not affected by impact are not modified. In this way, the computing time is shortened. The disclosed simulation method is able to simulate an entire experiment with respect to the number or the mass of impinging particles and with respect to an arbitrary object size.

The method for simulation according to the invention is, in particular, a computer-based method, wherein a specific technical, simulated object is exposed to a simulated collision with particular particles and/or radiation. The simulated results can consequently be used to optimize the object with respect to technical properties, for example to increase the fatigue strength and/or the resistance against erosion.

One aspect of the invention relates to the highly simplified analysis of the collision processes—see below: mass principle—and the use of random methods. In particular, the simple memory design by means of the mass memory and the control memory—where necessary, designed as a shared simulation memory—helps increase the efficiency of the method.

In an extension of the basic principle, it is proposed that the collision event acting on the particle, the radiation unit and/or the affected object element or volume element comprises at least one of at least two elementary events. A removal of mass from an object element or volume element is considered to be a first elementary event, wherein a second elementary event is a change of qualitative element properties of an object element or volume element.

According to an embodiment of this extension, the collision event acting on the particle, the radiation unit and/or the affected object element or volume element includes at least one of at least three elementary events, wherein a third elementary event is an addition of mass to a volume element.

According to a further embodiment of the extension, at least four elementary events are provided within the scope of the simulation method. In this connection, the collision event acting on the particle, the radiation unit and/or the affected volume element is at least one of at least four elementary events, wherein the fourth elementary event is a displacement of mass from one object element or volume element to another object element or volume element. In particular, the fourth elementary event can be regarded as a combination of the first and third elementary events, since, during a displacement process, mass is removed from one object element or volume element and added to another volume element.

So as to advantageously simulate different collision events, such a collision event is composed at least of a combination of the first, second, third and/or fourth elementary events.

The above-described analysis, interpretation and estimation of consequences of an interaction of an object with a particle and/or radiation unit take place by carrying out a simplified analysis of the collision event and a likewise simplified and standardized analysis of the consequences on the mass of an affected volume element or object element. Since the focus here is on the phenomena "remove mass", "add mass", "displace mass" and "change the properties of mass," this method is referred to as the use of the mass principle.

Hereafter, physical collision events will be described in a non-exhaustive and non-limiting manner, wherein the corresponding application of the mass principle is mentioned.

Strain hardening: If the material of the hit object element is a metal, an impinging, hard particle can cause a change and/or damage to the object even when the particle does not leave behind any visible impression, or hardly leaves behind any visible impression, therein. Small dislocations and imperfections can arise in the object, which ensure that the layers of atoms in the metal are not able to slide over one another as easily any longer, but block a relative movement. Depending on the metal, this may result in an increase in hardness, which in turn can influence the erosion behavior.

In the database of the simulation program, it is stored whether a metallic object to be simulated is prone to strain hardening, for example by providing a prime number associated therewith in the control memory. Moreover, the object elements in the hit region are checked based on the presence of a corresponding value in the control memory location of the control memory, for example as to whether these object elements have already been hit once or several times. If this is the case, the properties of the corresponding mass are changed, for example by an increase in hardness. It is likewise documented whether ceramic fractions in the hit region of the object have been hit once or several times. While no strain hardening takes place here, microcracks that arise can also influence the hardness/the threshold value of the ceramic.

If a property applies to a large region of the mass memory, such as to the object, it is also possible to take the strain hardening into consideration by introducing an appropriate variable, a so-called flag. This variable either has the value 'logic zero', that is, no strain hardening, or 'logic one' for strain hardening of the metal.

Plastic deformation: If the object is a metal, an impinging, hard particle can cause an impression in the object, without remaining stuck therein. The impression consists of an indentation (crater) and a mound forming around there. So as to establish whether plastic deformation can take place, it is possible according to one embodiment to query whether the material of the particle is harder than the material of the object or the material present at the collision site.

As a function of the impact velocity, the mass and the material properties, a depth or extent of the corresponding impression is calculated based on a stored, physical model, for example based on the calculation of the penetration depth. The mass present there is removed from the affected volume elements and added to the volume elements affected by the mound. The removal and addition of mass in another location, that is, a displacement of mass, can take place by way of predefined rules: For example, the mass to be displaced is evenly disposed at a radius around the crater on the object, that is, in empty volume elements.

The guard/nearest neighbor function described hereafter may be used for this purpose.

In this connection, it shall be mentioned that elastic deformation also always occurs during such processes. However, this process is reversible. Material that was displaced as a result of the impact of the particle returns to the starting point thereof due to elasticity. Since such an elastic process does not cause any effective/permanent change within the meaning of the mass principle, it is not taken into consideration according to one embodiment. According to one embodiment, only processes that result in permanent and/or irreversible changes are considered within the scope of the simulation method.

Furrowing: When a hard, sharp-edged particles does not impact on a softer object exactly perpendicularly, but at an angle deviating therefrom, material can be removed from the surface by cutting, scratching or scraping processes.

According to one embodiment, so as to establish a presence of furrowing, it is possible to query whether the material of the particle is harder than the material of the object or the material present at the collision site, whether the angle of incidence is not orthogonal and/or whether the particle has a sharp-edged structure.

Even in the case of a nominally perpendicular incidence, collisions of the particles in a particle jet stream can cause a certain number of the particles to be imparted a velocity component parallel to the surface of the object. This parallel/transverse component in the impact movement can result in the formation of furrows.

The furrowing phenomenon can be accounted for in the simulation, for example, by a statistical approach, in that more mass is removed, due to furrow formation, with a certain percentage (hereafter the furrowing percentage) of impinging particles than would be permissible according to the underlying physical models, for example for the calculation of the penetration depth.

According to one embodiment, the furrowing percentage is between 3% and 8% of all impinging particles, and in particular 5%, wherein according to a uniform distribution in each case 2 to 10 times the mass is removed from the object or from volume elements belonging to the object.

According to one refinement, furrowing could be determined in more detail by breaking down the velocity of the individual particles into vectors. For example, the penetration depth, and thus the furrow depth, could be calculated from the perpendicular component. The parallel component could be used to determine the length of the furrow based on a suitable model.

Becoming stuck: Hard, impinging particles can become stuck in a softer material of the object. Crater edges made of object material become raised around the stuck particles. This is a collision event similar to "bouncing off," the individual particle in this case, however, remaining in the object.

As a function of the impact velocity and the mass of the impinging particle, it is determined how deep the particle penetrates the object and where it has become stuck. The mass present at this location is removed there and added at the crater edges, that is, displaced. The mass of the particle is added at this point, according to the dimension thereof. If necessary, even initially massless volume elements above the object are occupied with particle mass, so that this protrudes from the object.

Embedding: If particles already stuck in the object are hit by another individual particle, the particle stuck in the object may be pushed deeper into the object, that is, become embedded. Similarly to becoming stuck, this results in a displacement of object mass toward the raised crater walls.

As a function of the impact velocity and the mass of the impinging particle, it is determined based on a mathematical model, such as penetration depth, how much deeper the particle that is already stuck is being embedded in the object. The mass present at this location is removed there and added at the crater edges, that is, displaced. The mass of the hit particle is likewise removed and reinserted in a deeper location into the object.

Disintegration: This collision event occurs when a particle that is already stuck in the object and already embedded is hit by another individual particle. In this case, the portion of the embedded particle protruding beyond the object surface may be disintegrated. Only when stuck particles are already embedded and are hit again can these be disintegrated.

As a function of the impact velocity and the mass of the impinging particle, some or a portion of the mass of the hit, already embedded particle is removed. According to one embodiment, the portion to be removed can, for the purpose of simplification, be determined by way of the model regarding the penetration depth or the crack depth. Which model is employed depends on the share of metal (penetration depth model) and ceramic (crack model) that is present in the contact zone. Depending on the calculated penetration depth or crack depth, the disintegrated share of the embedded particle is determined, wherein the mass data value of the corresponding volume elements representing the embedded share of the particle to be removed is set to "zero", and the control data value is set to "mass not present", that is, "empty." Mass segments of the embedded particle still stuck in the object are displaced and thus further embedded.

Erosion of ceramic or of ceramic particles: Hard particles, when impinging on a likewise hard material (such as ceramic), can cause damage when the impact force occurring during impact exceeds a material-specific threshold value. If this is the case, cracks occur in the object, which result in conchoidal chipping. For example, it can be checked whether the hardness of the object at the impact site or in the impact region and the hardness of the individual particle are greater than a particular limit hardness and/or whether the material at the impact site or in the impact region is ceramic. This is irrelevant whether the object itself is ceramic or whether the surface of a metallic object includes a layer including adhering and/or embedded ceramic particles due to prior bombardment.

As a function the impact velocity, the mass and the material properties, the impact force of the respective particle is determined based on a stored physical model, for example regarding crack formation in ceramics. Likewise, the threshold force below which the ceramic material of the object remains without damage is determined based on the local material properties. If the impact force exceeds the threshold force, the size of the conchoidal fracture, and thus the mass to be removed, is determined based on the physical model. Thereafter, mass is removed from the affected object elements. Literature regarding the addressed physical models can be found, for example, at: Journal of the American Ceramic Society, 1982, vol. 65, p. 561-566: D. B. Marshall, B. R. Lawn, A. G. Evans, "Elastic/Plastic Indentation Damage in Ceramics: The Lateral Crack System."

In the course of the simulation, it is consequently queried, based on the stored physical models, whether the collision events, such as those described above, can occur under the given parameters of the impinging particle, such as size, weight, shape and/or velocity, and the given parameters of the object, such as material, coating and/or strain-hardened metal microstructure of the object. These collision events are stored in the simulation as a sequence and/or combination of steps within the scope of the mass principle. Complex, real processes are simplified to such an extent that the simulation is able to process these quickly, without excessively compromising accuracy.

What elementary events occur individually or in combination, and thus result in the collision events—which, in turn, are a simplified simulation of the realistic, physical processes—depends on a number of conditions and the model that is used. Based on the stored causal logic and models, different elementary events are carried out, thereby enabling a simple, efficient simulation of the real physical processes. For example, the material type, the presence of strain hardening and/or hardness of the collision partners, the energetic state of the particles and/or the shape of the particles can be queried, so that, within the causal logic, a suitable simulation path can be selected.

According to one embodiment, the check for different real events, that is, the individual checking steps that result in the execution of different elementary events—which, in turn, simulate corresponding collision events—can be carried out according to the following sequence: checking steps regarding the disintegration of already embedded particles, followed by checking steps regarding the embedding of particles, followed by checking steps regarding particles becoming stuck, followed by checking steps regarding the erosion of ceramic material, followed by checking steps regarding the erosion of hard particles forming a hard surface, and followed by checking steps regarding plastic deformation of the affected object elements of the object.

It is also possible to analyze an actual composition and the respective amounts of mass in the contact region at the impact site or in the impact region of the individual particle. In principle, it is possible that certain events preclude one another, depending on the result of the analysis. For example, if already embedded particles are present in the affected region, further embedding is not very likely, and the presently impinging particle becoming stuck is impossible. Or, for example, when the result of the analysis shows that primarily metal is present at the site of the impact, embedding and disintegration of particles is very unlikely to impossible. A particle, in all probability, will become stuck.

According to a further embodiment, the simulation method includes a so-called guard/nearest neighbor function. This is designed in such a way that during a displacement—that is, during the removal and addition of mass at another location—no simulated object elements are filled with mass without relationship and contact in the simulation volume. If, for example, a collision with an individual particle results in a crater formation, with or without embedding of the particle, the mass of the object elements present at the crater site is deposited at the edge of the crater according to a predefined rule.

It is the task of the guard/nearest neighbor function to check whether the displaced mass—that is, the arrangement of removed mass in massless volume elements—is in direct contact with other object elements or with mass-containing volume elements and volume elements that are in direct contact with the object. If a volume element having displaced mass present therein be located in the simulation volume without any contact, the guard/nearest neighbor function detects this and deletes the corresponding mass from the simulation volume. The mass thus removed is counted for documentation purposes, and can thus be interpreted as a loss of mass of the object at the end of the simulation. For example, for the removal of mass, it is taken into consideration that the energy released during the particle impact may exceed the binding energy between mass elements, which can cause bonds to break up and mass to fly away, that is, be removed.

If a physical relationship between displaced mass and further object mass is detected, the type of contact between the mass-containing volume elements is examined. In particular, due to the cube shape of the volume elements, a distinction can be made here between surface contacts (there are a maximum of six such contacts), line contacts (a maximum of twelve) and point contacts (a maximum of eight). The contacts have different weights/significances. According to one embodiment, a surface contact is weighted the same as four line contacts or 16 point contacts, and a line contact is accordingly weighted the same as four point contacts. So as to establish a physical relationship between individual volume elements provided with mass, at least one two-surface equivalent is needed. If, for example, a point contact is set at one, a line contact counts as four and a surface contact counts as 16. The two-surface equivalent then has the value 32. As a result, mass can be displaced to where the sum of point, line and surface contacts with filled neighbor compartments/cubes results at least in the value 32. Mass can thus be displaced into a single cube surrounded by empty compartments, as long as all other compartments therebeneath are filled. This results in four point contacts, four line contacts and one surface contact, resulting in a contact equivalent of 4×1+4×4×1+1×4×4=36>32. According to further embodiments, equivalents and weights of the contacts deviating therefrom may be necessary.

According to one aspect of the invention, the simulation method includes a conversion of dimensions indicated in SI units into the simulation-relevant core dimension. This core dimension thus corresponds to a basis of the simulation program and reflects the edge length of a volume element. If, for example, a volume of 5 mm×5 mm×2 mm is to be simulated, and the smallest volume that can be resolved is a volume element having an edge length of 10 µm, 6.25 million volume elements are required for this simulation.

In this way, a conversion from real dimensions into a discrete system of units, and vice versa, takes place. According to one embodiment, a random number generator having uniformly distributed random numbers is used, whereby discrepancies in the calculation in relation to the discrete edge length system of units are statistically compensated for. This is to be illustrated based on an example, without limiting the invention:

An exemplary edge length of the volume elements is 20 µm. A particle impact on object elements results in a calculated penetration depth of 5 µm. The calculated penetration depth is thus below the representable dimension of 20 µm, whereby a simulation error would be provoked. To solve this, the quotient of the calculated penetration depth and the edge length of the volume element is created, which would be ¼ in this example. By way of a uniformly distributed random number, the penetration depth is either determined at an edge length of 0 or an edge length of 1, wherein the quotient establishes the probability whether the penetration depth has an edge length of 0 or an edge length of 1. In the specific case, this means that the random number generator is used in such a way that the penetration depth is set at one edge length with a probability of ¼, that is, 25%, but is set to 0 with a probability of 75%.

Generally speaking, the quotient of the calculated penetration depth or of a simulation-relevant value and the edge length in SI units indicates the probability of the accordingly configured random number generator with which the particles would penetrate the object by a full edge length.

According to a further embodiment of this conversion method, it is also possible in this way to convert other calculated interim values into discrete edge lengths.

In connection with the above-mentioned aspect of the conversion, a relevant combination of functional principles of the invention will be highlighted hereafter: (i) providing memory elements, wherein the mass memory denotes the exact value of the mass and the control memory denotes the property/history thereof, and moreover a possible energy memory or further memories are provided. In this way, the (ii) use of the mass principle is made possible, which simplifies complicated, real processes within the meaning of a faster, simpler and spatially/temporally more comprehensive simulation, compared to the prior art. (iii) The conversion of SI units into base dimensions of the underlying simulation cubes ties the memory/mass concept to the physical reality and enables the application thereof.

One or more of the above-mentioned embodiments of the invention can be configured in such a way that, by way of a suitable occupancy of mass memory locations with mass and appropriate logical geometric linking of the mass memory locations, it is possible to represent a collectivity of object elements in the simulation volume, which, in turn, corresponds to a particular geometric structure. In this way, it is possible to simulate a wide variety of geometric structures in the simulation volume, for example coated surfaces, tubular items, turbine blades or a structure of a satellite, such as an outer shield of the satellite.

In this way, it is also possible to model oblique surfaces, in that the boundary between volume elements provided with mass and empty volume elements with respect to a main heading of the individual particles is oblique.

According to a further embodiment, a local particle or radiation unit source is assumed when the simulated interaction is carried out, wherein multiple distribution functions, and in particular distribution functions of a present location and a velocity of the particle or of the radiation unit, are used superimposed for representation.

Furthermore, it is possible that further, external radiation/particle sources are possible. Moreover, particles that are knocked out in one location of the object may themselves cause erosion events in other locations of the object, whereby the object can become the particle source.

In the context of the abovementioned, a method for designing and/or testing an object, in particular a technical structural component, using the method for simulating impacting particles or radiation on the object according to one or more of the above embodiments is disclosed. In particular, the design process of the object, for example of a turbine blade of an aircraft engine, can be defined in that, prior to the provision of a specific, real prototype of the type in question, a corresponding simulated, that is, sufficiently determined, prototype is exposed to a simulated action by impinging particles or radiation, wherein the method for simulation according to one or more of the above exemplary embodiments is used.

Within the scope of the invention, a computer program product is disclosed, which can be stored on a computer-readable medium, for example on a hard drive or on a mobile data carrier. Moreover, according to one embodiment, the computer program product can be downloaded via the Internet onto a computer. The computer program product is designed so as to be able to carry out the method according to one or more of the described embodiments, in particular when it is executed on a computer system.

According to one embodiment, the computer program product comprises a sub-program for automatically writing to the mass memory locations of the mass memory and to the control memory locations of the control memory. This is carried out in such a way that the simulated object composed of object elements is automatically constructed according to a predefined geometric shape having at least one particular property and/or one particular energetic state. In particular, the sub-program can provide design aids for creating the object.

Moreover, according to one embodiment, the computer program product can comprise a sub-program for outputting a state of the geometric structure of the object and/or of a total mass of the object. Such a sub-program is designed in such a way that the progress of the simulated erosion is represented qualitatively and quantitatively, for example by a three-dimensional representation of the object.

Within the scope of the invention, moreover a computer system is disclosed, which comprises a control memory including control memory locations, a mass memory including mass memory locations, a processing unit for processing data stored in the control memory locations and in the mass memory locations. Furthermore, the computer system is provided with an input device. The computer system is designed in such a way that the computer program product can be executed on this computer system according to one of the described embodiments.

The above-described embodiments can be combined with one another in an arbitrary, but meaningful manner.

BRIEF DESCRIPTION OF THE DRAWINGS

The accompanying drawings illustrate embodiments and, together with the description, are provided to explain the principles of the invention. The elements of the drawings are shown relative to one another and are not necessarily to scale.

Identical reference numerals denote accordingly similar parts.

FIG. 6 shows a third portion of the flow chart according to FIG. 4; and

DETAILED DESCRIPTION

Figure 1:
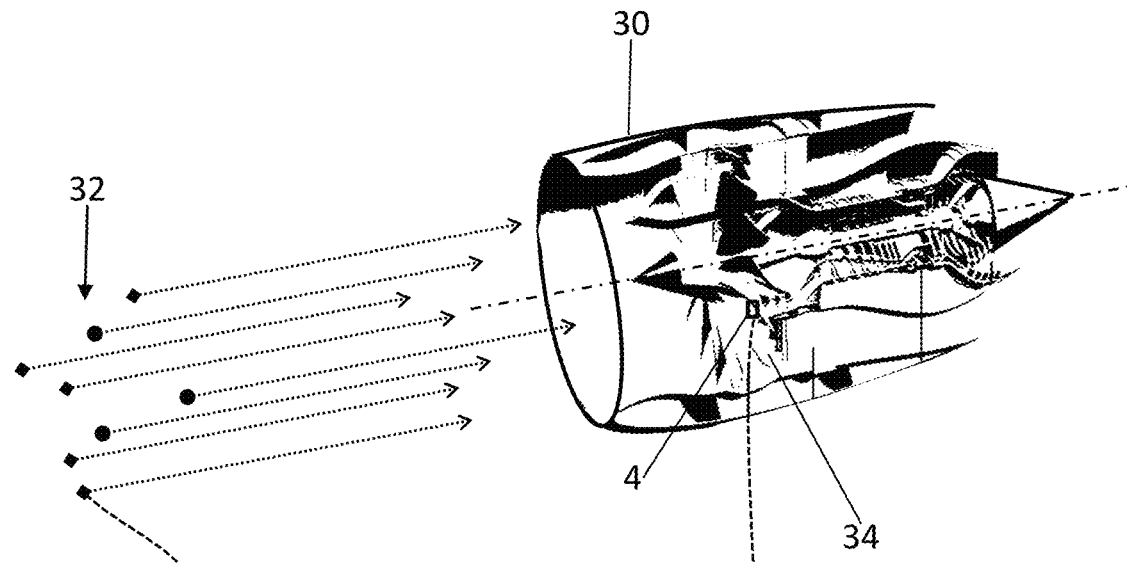
FIG. 1 shows a schematic representation of an aircraft turbine under particle impact.

FIG. 1 shows a schematic aircraft engine 30 having a fanjet design, which is being operated in an environment containing ash. Such a situation arises, for example, when air masses are substantially polluted with particles 32 due to volcanic eruption or heavy air pollution. In principle, this results in the risk of an aircraft engine 30 becoming damaged, wherein, in particular, the highly stressed turbine blades 34 are jeopardized. The particles 32 present in the air impact against the turbine blades 34 of the aircraft engine 30 at a velocity of up to 900 km/h and possibly at 900° C., wherein the structural stability of the turbine blades 34 can be decreased due to particle erosion. Furthermore, particles 32 can deposit on the turbine blades 34, whereby an increase in mass of the turbine blades 34 is caused, which, in turn, can lead to a dramatic imbalance condition all the way to the destruction of the aircraft engine 30.

Figure 2A:
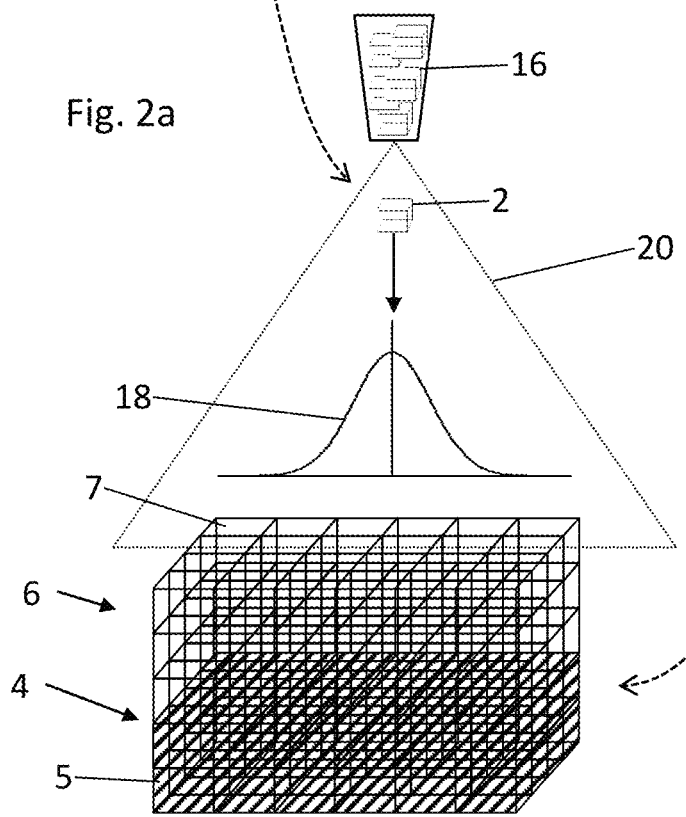
FIGS. 2a and 2b schematically describe a simulation model for processes according to FIG. 1.
Figure 2B:
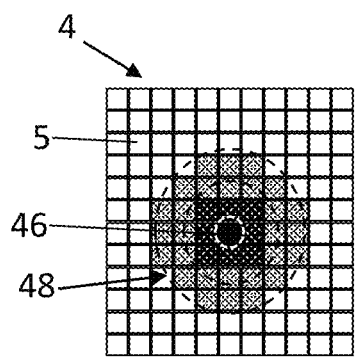

So as to be able to assess the intensity of particle loading of an aircraft engine 30, which can lead to failure and/or lasting damage, and without carrying out extremely complex, realistic erosion experiments, within the scope of the invention a corresponding simulation method for simulating articles 2 impinging on an object 4 was developed (FIGS. 2a and 2b). The method according to the invention and accordingly embodiments thereof according to the invention are characterized in that the computing complexity is considerably lower, compared to simulated erosion experiments according to the prior art. In this way, it is possible to use less expensive simulation computers and carry out a higher number of simulations in a shorter time. In particular, it is possible to expose a plurality of different objects, for example different types of turbine blades made of different materials, to a wide variety of particle erosion situations in a simulated environment. As a result, guidelines and limit values for the use of aircraft turbines in particle-loaded ambient air can be defined.

Furthermore, it is also possible to use the simulation method according to the invention and embodiments thereof in other technical fields: For example, it is possible in this way to find out the consequences that a particle collision or particle erosion due to cosmic dust causes for satellites, probes and other space vehicles. As a result of an exact simulation of the effect of particle erosion, outer shields of spacecraft can be designed with such loads in mind, and weight can be saved.

Based on FIGS. 2a and 2b, fundamental modes of operation of embodiments of the simulation method will be described: So as to simulate a particle collision with an object 4, the object is modeled in a simulation volume 6 based on object elements 5. The simulation volume 6, in turn, is composed of a number of volume elements 7, which each represent a cube-shaped experimental space, and wherein the sum of the volume elements 7, and thus the simulation volume 6, represents a complete volume of an experimental space. The edge length of a volume element 7 is thus the smallest size to be simulated, wherein—when dropping below—no information can be provided.

The edge length of the volume element acting as a base cube can be selected freely by the user of the invention, and as is appropriate for the respective problem to be simulated. As an example, a length of 10 μm is selected for the edge length of the volume element 7 acting as the base cube. If a cuboid object 4 having the dimensions 50 mm×25 mm×5 mm, for example a section of the turbine blades 34, is to be modeled therewith, 6,250,000,000 volume elements are necessary to do so.

Figure 3:
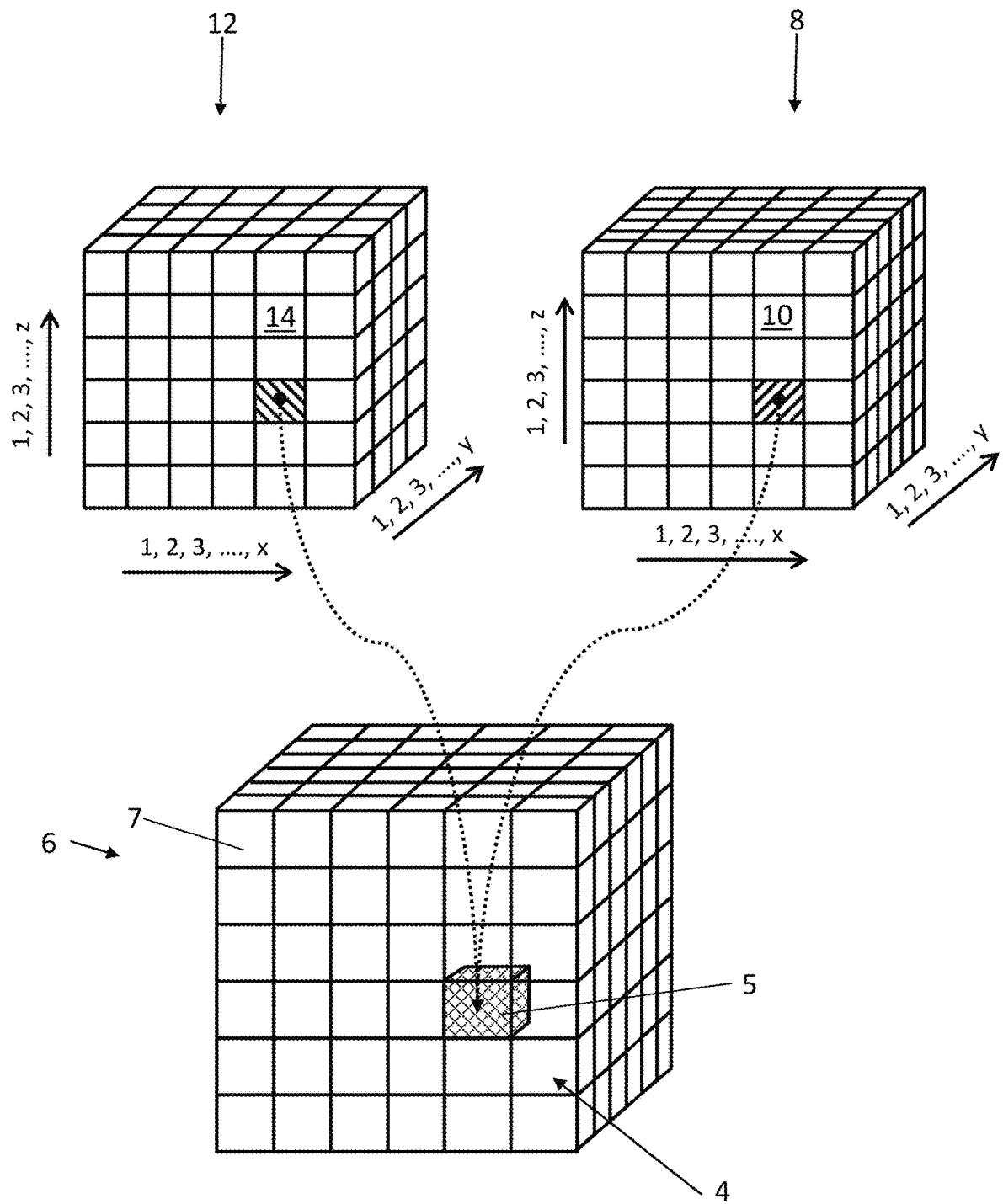
FIG. 3 illustrates the design of the mass memory, of the control memory and of the simulation volume formed thereby.

By way of FIG. 3, an embodiment of the model and memory structure of the simulation volume 6 is presented. The simulation volume 6 is of a purely virtual nature and is formed by the logical combination of a so-called control memory 8 and a mass memory 12. The mass memory 12 includes a number of mass memory locations 14, and the control memory 8 includes a number of control memory locations 10.

Since a number of volume elements 7 of the simulation volume 6 constitutes a row of volume elements 7, and since a number of volume element rows constitutes a plane of volume elements 7, the simulation volume 6 is formed by stacking the volume element planes. Consequently, a Cartesian coordinate system can be introduced, whereby each volume element 7 can be unambiguously localized by way of a 3-tuple. Both the mass memory 12 and the control memory 8 have a logical structure equivalent to the Cartesian structure of the simulation volume, wherein an unambiguous mass memory location 14 of the mass memory 12 and an unambiguous control memory location 10 of the control memory 8 can be assigned to each volume element 7 of the simulation volume 6. Consequently, a particular control memory location 10 can be unambiguously assigned to a mass memory location 14 by a 3-tuple. In the example according to FIG. 3, the hatched volume element 5 can be unambiguously localized by the 3-tuple (5, 1, 3). Moreover, the corresponding hatched control memory location 10 and the mass memory location 14 can in each case be unambiguously assigned to the hatched volume element 5 (5, 1, 3) by way of the same 3-tuple (5, 1, 3).

The structure of the experimental object 4 in the simulation volume 6 is formed as follows: In the control memory 8, it is determined which volume elements 7 of the mass memory 12 are to be occupied with what type of mass, whereby these become object elements 5. According to the present embodiment, the user can select between the types 'substrate', 'coating' and 'particle.' In future embodiments, more detailed, more comprehensive options and resources for processing of the control memory 8 and the control memory locations 10 thereof by the user are provided for. The user selects the characteristic data of the materials to be simulated, which are required for the simulation, from a database and/or personally enters the data. This includes, in particular, the density. By establishing the edge length of the base cube of the simulation, that is, of the volume element 7 underlying the simulation volume 6, the user determines the smallest volume still to be observed by the simulation, that is the size of the volume elements 7. From this, and from the density of the materials to be simulated, results the amount of the mass with which the mass memory locations 12 of the mass memory 14 are to be occupied at a predefined temperature. After the control memory 8 has been processed by the user, the user has to finish by confirming the start conditions of the simulation established in the control memory 8. In particular, thereafter the user can no longer access the control memory 8.

The control memory 8 including the control memory locations 10 thereof is used to add, store and, if necessary reproduce, individual properties, an element type, particular other characteristics and/or an energetic state of a respective volume element 7. In cooperation with the respective assigned mass memory location 14, a respective control memory location 10 completely and comprehensively describes the corresponding volume element 7 of the simulation volume 6 or the object element 5 of the object 4. In particular, the starting situation is and/or the starting conditions are determined at the start of the simulation. During the course of the simulation, the effect on the mass memory is documented there.

This information about properties, element type, and the like is preferably stored in compressed form—as described above—in a control memory location 10. Here, for example, hardness, modulus of elastic, or density of the respective object element 5 are considered properties. Moreover, the element type can be indicated, that is, whether the object element 5 is to be considered a coating, a paint, a hardened layer or the base material of the object 4. In principle, the properties are constant within a specific object element 5.

After the starting situation for the simulation was determined by the user in the control memory 8, the control memory locations 10 thereof are read out memory location by memory location, and the associated mass memory locations 14 of the mass memory 12 are occupied with mass based on this information. Reference is made to FIG. 2a for illustration purposes, wherein the object 4 is only formed by occupying the bottom two volume element planes with mass. The top three volume element planes, in contrast, are empty. Consequently, mass would only be provided in the 'bottom two planes' of the mass memory locations 14 of the mass memory 12. The spatial description of the organization of the mass memory 12 is only used here to explain the invention and shall not limit the invention. In that a volume element 7 of the simulation volume 6 is provided with mass by accordingly occupying a mass memory location 14 of the mass memory 12, this mass-containing volume element 7 can also be referred to as an object element 5 of the object 4.

Furthermore, the simulation volume 6 can be designed to be larger than the simulation object 4 present therein. In this way, reshaping of the object 4 into initially empty volume elements 7 becomes possible. This is the case, for example, when the impact of a particle 2 on an object 4 results in a crater formation at the impact site 46 or in the impact region 48, wherein a mound is formed at the crater edge by the material originally located in the crater. In this case, the mound protrudes beyond the original surface of the object 4 and is formed by the occupancy of original volume elements 7 with mass. In particular, it has been shown that it is sufficient and efficient to keep empty, that is, massless, volume elements planes available above the object 4. The number of volume element planes to be kept clear depends on the size of the particles, which can protrude from the surface of the object 4 after becoming stuck. The distribution is known. In particular, maximum possible particle sizes are estimated at the beginning of the creation of the mass memory 12. However, according to the default setting at least the top four planes remain empty. The wording "above" shall be understood to mean that the empty volume element planes are provided between the surface of the object 4 subject to interaction and the simulated particle source 16.

The control memory 8 including the control memory locations 10 thereof is used to add, store and, if necessary reproduce, individual properties, an element type, particular other characteristics and/or an energetic state of a respective volume element 7. In cooperation with the respective assigned mass memory location 14, a respective control memory location 10 completely and comprehensively describes the corresponding volume element 7 of the simulation volume 6 or the object element 5 of the object 4. At the start of the simulation the starting situation/the starting condition is determined there. During the course of the simulation, the effect on the mass memory is documented there.

This information about properties, element type, and the like is preferably stored in compressed form—as described above—in a control memory location 10. Here, for example, hardness, modulus of elastic, or density of the respective object element 5 are considered properties. Moreover, the element type can be indicated, that is, whether the object element 5 is to be considered a coating, a paint, a hardened layer or the base material of the object 4. In principle, the properties are constant within each volume element, and in particular within a specific object element 5.

Figure 4:
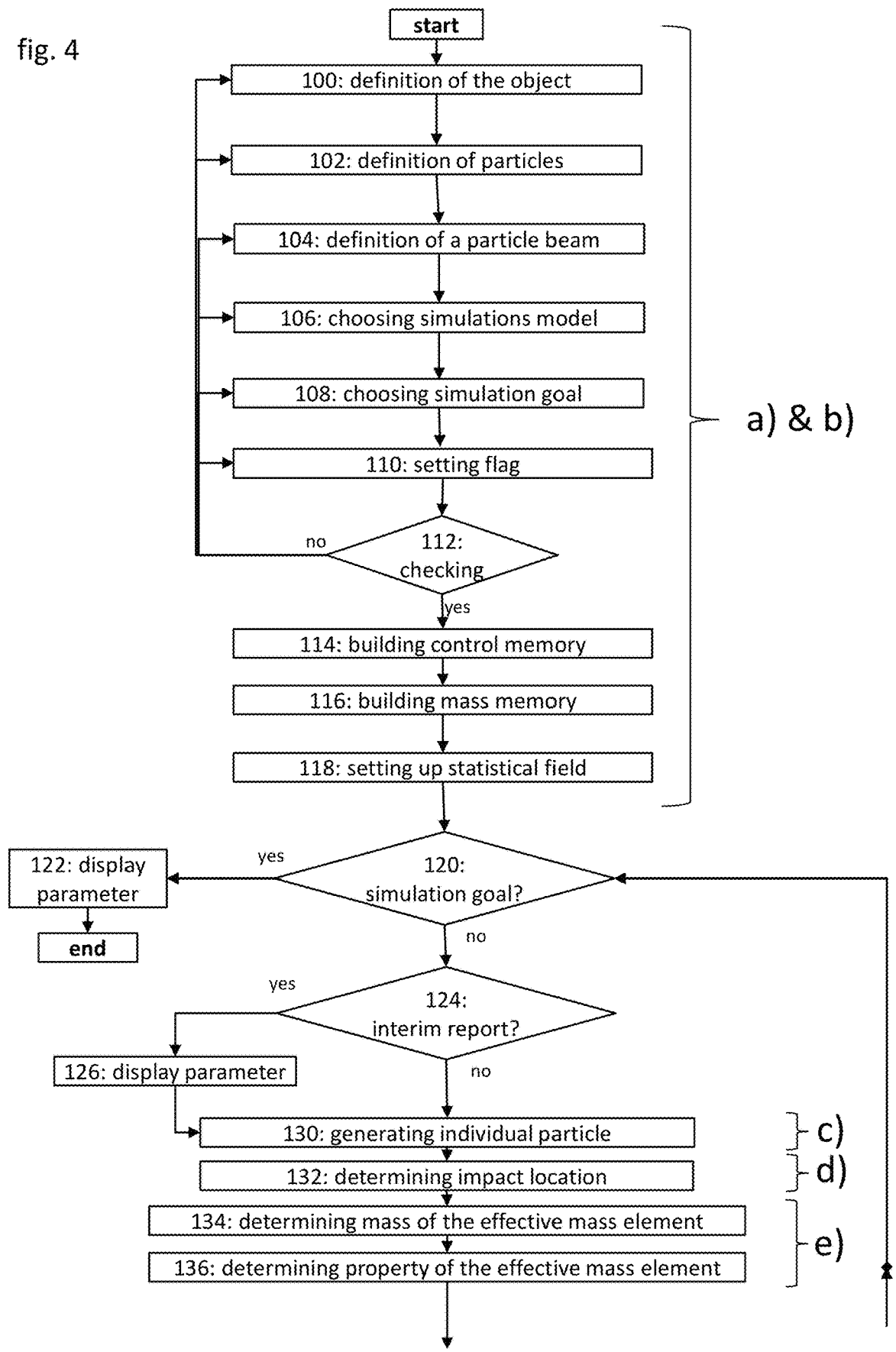
FIG. 4 shows a first portion of a flow chart of an exemplary design of the simulation program.

By way of the flow chart covering FIG. 4, FIG. 5 and FIG. 6, an exemplary, non-limiting flow of the simulation method will be described.

At the start of the simulation program, the configuration of the object 4 is to be determined in a step 100 by meaningfully storing data in the control memory 8. For example, the shape, the structural design, the temperature, the material and the associated properties of the object 4 are either requested by the user, read out from a previously created database or created automatically with the aid of a subroutine.

In step 102, the particles 2 designated for the interaction with the object 4 are defined. In particular, the shape and the size, the density, the hardness and the like of the designated particles 2 are to be determined. Statistical methods can be employed with respect to the shape and size of the particles 2. If, for example, it is determined, in step 102, that the particles 2 are to have a spherical shape, the size and uniformity of the spherical shape of an individual particle 2 designated to interact later with the object 4 can be generated by way of a normal distribution around a mean value. In step 102, features are thus determined and/or statistical methods are selected, which apply to all particles 2. The specific particle 2 designed for the interaction with the object 4 is formed at a later point based on this general information.

The type of interaction between the object 4 and the individual particle 2 is determined in step 106. For this, the parameters of a particle jet stream 20 are either entered by the user (step 104) or read out from a database. Again, distribution functions 18 regarding the velocity of the particles 2 and the directional components thereof are used. It is apparent in FIG. 2*a* that the particle jet stream 20 passes over the entire surface of the object 4 in the simulation volume 6, so that—depending on the distribution function 18—particles 2 impact primarily centrally on the object 4, but another share of particles strikes edge regions of the object 4 or may even travel past the object 4.

Furthermore, it is to be determined, in step 106, which simulation models are used in the determination of the collision processes between the particle 2 and the object 4. This depends, among other things, on the materials used or affected in each case. In the case of a metal-metal material pairing, for example, it is possible to select models according to Forrestal, as described above. It is also possible to use FEM-based models (FE Johnson-Cook) for the determination of the individual collision processes.

According to step 108, the simulation goal is to be defined. For example, a total particle number or a total mass of the particles 2 intended for erosion or a total loss of mass—caused by the particle erosion—of the object 4 can be used for this purpose.

Based on the information from the user or based on a database, so-called markers or flags can be set in step 110, which provide further properties of the object elements 5. For example, this can be the property that a material of the object 4 is prone to strain hardening.

In the course of a checking step 112, the program can examine the validity of the pieces of information entered in steps 100 to 110 according to internal criteria and/or a plausibility check and, if necessary, request appropriate new input. At this point, the user has the last opportunity to review and, if necessary, adapt the starting situation for the simulation according to the information returned by the program.

During step 114, the control memory 8 is created according to the pieces of information determined in steps 100 to 110 or according to default settings. Thereafter, in step 116, the mass memory 12 is occupied with mass based on the information of the control memory 8. As a result of these steps, the mass memory locations 14 of the mass memory 12 and the control memory locations 10 of the control memory 8 are sufficiently provided with data, so that the simulation volume 6 with the test object 4 is defined. The object 4 can comprise different object elements 5, for example a configuration as a coated base material can be simulated, wherein the base material can have a lower hardness than the coating.

In a step 118, the statistical fields necessary for the simulation process and the presentation of the results are set up.

Steps 100 to 118 represent steps a) and b) described in the claims, wherein the specific order can be variably selected depending on the application. In particular, in the course of these steps, the size of the volume elements 7 is indicated in SI units, and thus a factor for converting the discrete element positions into real geometric information is established. The program can provide an appropriate rule, in particular how to handle resulting fractional amounts of edge lengths.

After, in step 120, it was already checked, with a negative result, whether the simulation has been achieved, the actual simulation and analysis of the interactions or the erosion of the object 4 with specific individual particles 2 starts.

During each simulation step, it is checked, in step 124, how many interaction or erosion processes have already been simulated, and whether an interim report is to be output, for example in the form of a display 126 of parameters, according to the program requirement.

In step 130, the individual particle 2 intended for the present interaction process is generated. The basic information determined in step 102 is used for this purpose and utilized to generate the individual particle 2 by way of statistical methods. If it is indicated in step 102, for example, that individual particles 2 are to have a sphere-like shape having a diameter of four edge lengths of a volume element 6, individual particles 2 having the dimensions 4×4×4, 5×4×4, 3×4×5, 3×5×3, and so forth would be generated, depending on the Gaussian distribution. If it was indicated, in step 102, that individual particles 2, in principle, are to have an angular or pointed shape, the specific shape of a particular individual particle 2 would vary by given mean values for length, width and height according to statistical methods. Moreover, the velocity and the directional components thereof of the individual particle 2 are determined by way of a distribution function 18. Step 130 corresponds to an embodiment of step c) of the claims, but does not serve to limit claim 1.

In step 132, a specific impact site 46 and/or an impact region 48 of the individual particle 2 on the object 4 is determined. In this way, the exact impact site 46 and the object elements 5 affected by the interaction and located in the impact region 48 are identified (FIG. 2*b*). Within the scope of the simulation method, the impact processes of a large number of erosion particles on an object 4 are considered individually and simulated separately. In particular, each impact of a particle 2 on the object 4 is considered to be a local event. Viewed in simplified terms, the actual collision between the individual particle 2 and the object 4 of the simulation is initiated by the determination of the impact site 46. This essentially, and in a non-limiting manner, corresponds to step d) of the claims.

The mass of the affected object elements 5 is read out, in step 134, from the respective mass memory locations 14 of the mass memory 12, and the properties of the affected object elements 5 are read out, in step 136, from the respective control memory locations 10 of the control memory 8. Steps 134 and 136 correspond to step e) of the claims in a non-limiting manner.

Figure 5:
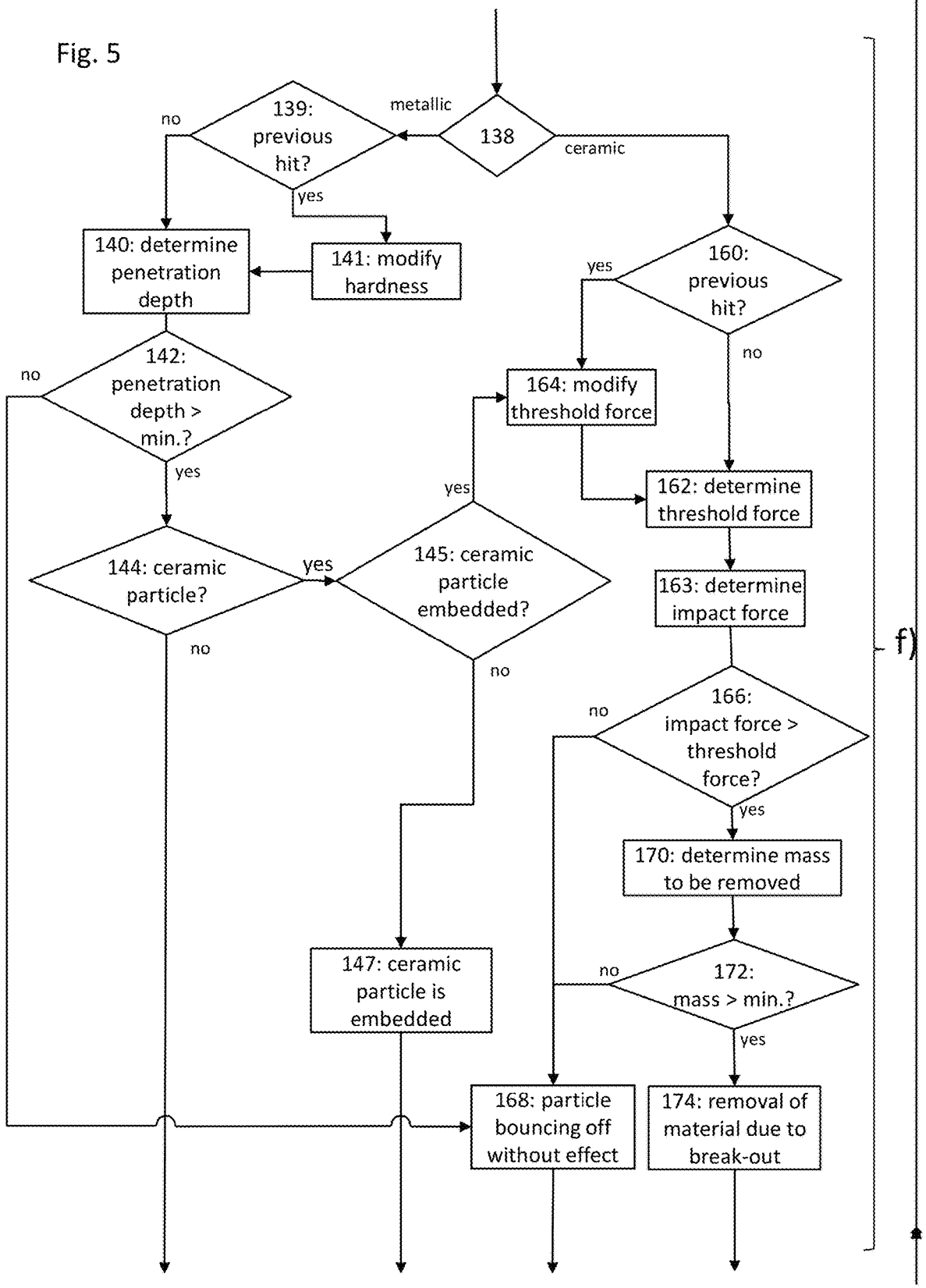
FIG. 5 shows a second portion of the flow chart according to FIG. 4.

FIG. 5 and FIG. 6 provide an example of a causality logic, with the aid of which the collision event acting on the individual particle 2 and the affected object elements 5 is determined. This method is a non-limiting example of step f) and parts of step g) of the claims.

In advance, it is queried, in step 138, whether the object 4 or the group of object elements 5 affected by the interaction is of a metallic or ceramic nature and/or whether the object 4 is made of a relatively soft (ductile) metallic material or of a relatively hard, and possibly brittle, material. Values for these are derived from the materials selected by the user or from the context of the respective specific application.

Moreover, it is checked, in step 139, whether the affected object elements 5 were already hit once before by an individual particle 2 during a prior interaction.

If a metallic object 4 is present, a penetration depth of the individual particle 2 in the object 4 is calculated (step 140) using the simulation model stored in step 106).

In connection with the calculation of the penetration depth, in step 141, if necessary, the hardness used for the calculation has to be modified if a prior hit resulted in strain hardening of the metallic material of the object 4.

Furthermore, it is checked, in step 142, whether the penetration depth calculated in step 140 exceeds a previously determined minimum value. For example, this minimum value can correspond to the edge length of the volume elements 7. If the calculated penetration depth is smaller than the minimum value, the ratio to the minimum value is calculated. If a random number to be generated is below this probability thus ascertained, the penetration depth is set to be equal to the minimum value. Otherwise, the penetration depth is set to zero, and the simulated collision event is rated as having been without effect. The individual particle 2 bounces off without consequence (step 168). Nonetheless, in step 182, the control memory 108 is updated in such a way that the particle collision rated as having been without consequence is counted in connection with the affected object elements 5 and in connection with the statistics (step 184) and the simulation goal to be achieved (such as particle number to be achieved or impact mass to be achieved).

If the calculated penetration depth exceeds the minimum value (step 142), it is queried, in the subsequent step 144, whether mostly metallic or ceramic material is present at the impact site 46 or in the impact region 48 of the object 4, or whether the affected object elements 5 are mostly of a metallic or ceramic nature. In particular, a threshold value may be used. For example, an 80/20 rule may be employed until this decision is made. If more than 20% of the affected object elements 5 are made of a ceramic material—or of a brittle material having relatively high hardness—a change of the simulation model via steps 145 or 164 takes place. If the metallic share of the affected object elements 5 exceeds 80%, the process remains in the metallic simulation model according to the causality logic, and accordingly the collision event and the consequence thereof are determined.

By way of steps 146, 150 and 154, a decision can be made as to which elementary events take place in keeping with the model by the erosion, and in particular whether mass is removed and/or added.

In step 146, it is determined whether the surface of the object 4 in the region affected by the particle impact is predominantly metallic. This can be carried out, for example, based on the type and amount of actually present mass, wherein the influence of blank spaces (empty compartments) can thus be taken into consideration. Furthermore, it would be possible to make the decision dependent on whether the actually ascertained, local property is closer to that of a ceramic or closer to a metal. If, for example, the local hardness is in the range of the value of the metal or the ceramic with a deviation of less than 20%, for example, the metallic or ceramic simulation model would be used. In the range in between, the ratio of the local property to that of the pure metal or of the pure ceramic could be used to determine the probability with which the metallic or the ceramic simulation model would be used. If a random number to be generated exceeds or drops below the corresponding probability, the corresponding model is employed.

If the check, in step 146, shows that the surface of the affected region of the object 4 is metallic, that is, relatively soft, the causality logic according to step 148 determines that the individual particle 2 of the simulated collision is stuck in the object 4.

In this case, in step 180, the mass memory 12 would be updated with respect to the change of the mass in the affected object elements 5, and the control memory 8 would be updated with respect to the change of the property in the affected object elements 5. Furthermore, according to one embodiment, the individual particle 2 that has become stuck could have displaced existing material of the object 4 in a crater-like manner. According to a corresponding rule, material from the location of the stuck individual particle 2 would thus be reorganized around the site. However, it is also possible that the individual particle 2 becoming stuck does not result in any change of the object elements 5 and the arrangement thereof.

In principle, it shall be noted that affected object elements 5—in particular during the reorganization 180 of the mass in the mass memory 12 or during the updating 182 of the control memory 8—are considered to include all object elements 5 that are arranged in the projection region of the impact surface of the individual particle 2 on the surface of the object 4 up to a depth to be determined. It has been found that three times the value of the calculated penetration depth is a favorable value for the above-mentioned depth.

If the simulation method according to the causality logic reaches step 150, it is examined whether furrowing of the individual particle 2 in the object 4 is taking place. This means that the collision of the individual particle 2 with the object 4 results in a groove being created in the surface of the object 4, and accordingly in a sliver being removed, according to step 152. The mass to be removed can be assumed globally based on the penetration depth, for example in that 2 to 10 times, and in particular 5 times, the penetration volume (penetration depth×surface area of the individual particle 2) is removed.

As an alternative, the volume of the sliver to be removed can be calculated from the penetration depth and the length of the sliver. The penetration depth can be calculated from a perpendicular velocity component of the individual particle 2 with respect to the surface of the object 4 and the length of the sliver to be removed from a parallel velocity component.

The decision made in step 150 can be made statistically, for example. For example, the assumption that 5% of all collisions result in furrowing is possible. As an alternative, this decision can be made based on the velocity vectors of the individual particle 2, in particular when a parallel component exceeds a certain limit value with respect to the surface of the object 4.

If no furrowing is determined in step 150, it is checked, according to step 154, whether the collision results in a removal of mass of the object 4, for example as a result of fusion and mass entrainment. For example, the collision energy can fuse some of the affected metallic object elements 5 and hurl the fused material away. This results in a removal of mass. It is possible to quantify the mass to be removed by way of the calculated penetration depth.

For this purpose, according to one specific embodiment, a temperature increase of the individual particle and of the hit object elements, and local fusion associated therewith, can be inferred from the known kinetic energy or velocity. In particular, the amount of energy that is required due to the deformation during the penetration of the individual particle into the object can be estimated based on the calculated penetration depth and the kinetic energy of the individual particle. As a result of subtraction, the residual amount of energy of the individual particle is known, which is available, for example, for the remaining velocity thereof and continued travel, and for increasing the temperature of the mass in the hit object elements.

Furthermore, it is possible to divide the remaining kinetic energy among the temperature increase of the mass in the hit object elements and the velocity of the individual particle that continues to travel/bounce off by way of a statistical method, for example by the use of random numbers. As a result, depending on the random number, the energy for the temperature increase $\Delta T$ would have to be assumed to be known. Taking the mass in the contact zone, the local heat capacity and temperature conduction phenomena into consideration, the change in the temperature-dependent material property caused thereby can be ascertained and taken into consideration in the reorganization of the mass in the mass memory 12 (step 180). If the ambient temperature is above the local melting temperature of the material, taking the temperature increase based on the particle impact into consideration, the material can fuse. As a function of the impulse transferred by the impinging particle, fused material can be hurled away when the impulse is sufficiently large. If, in contrast, the impulse is sufficiently small, a transfer to the particle can take place. The amount of fused material can be assumed as a measure of the amount of material that is hurled away and/or transferred. The penetration depth can be a measure of the point up to which the particle is 'covered' by transferred mass, and the impulse limit can serve as a measure or decision-making criterion as to whether mass is hurled away or transferred, or whether 'covering' is to occur.

If it is determined, in step 154, that no local fusion is taking place, according to step 158 plastic deformation of the affected region of the object 4 is assumed. A crater-like configuration at the collision site may occur, in particular an indentation—calculated, for example, from the penetration depth—occurring at the specific site of the impact of the individual particle 2, and the material originally present therein can form a ring-shaped crater mound. Accordingly, in step 180, the mass memory 12 is updated, and in step 182, the control memory 8 is updated.

In principle, mass is added or removed, or displaced, in the affected region of the object 4 in steps 148, 152, 156 and 158 according to predefined, simplified processes.

If it is determined, in step 138, that the object 4 is essentially made of ceramic material, an alternative path is taken in terms of the causality logic. In particular, different simulation models are employed.

Based on the known velocity of the individual particle 2, and having knowledge of the nature of the affected object elements 5, the impact force at the impact site 46, and a threshold force present there (step 162), can be calculated in step 163 by way of the stored simulation model.

If the impact force exceeds the threshold force, the mass to be removed at the impact site 46 or in the impact region 48 is determined, in step 170, according to the simulation model. It is assumed that, when the threshold force is exceeded, a crescent-shaped crack forms at the collision site, which results in material undergoing conchoidal chipping at the impact site 46 or in the impact region 48.

According to step 172, it is checked whether the particular mass to be removed exceeds a minimum value. If this is the case, according to step 174, the removal of material due to break-out is determined, and this is documented and accordingly reorganized according to steps 180 and 182.

If it is found, in step 166 or in step 172, that the calculated impact force is lower than the threshold force, or that the mass to be removed is below the minimum, it is assumed, according to step 168, that the individual particle 2 has bounced off without effect. Mass is not reorganized in the mass memory according to step 180; however, in step 182, the hit at the impact site 46 is documented when the control memory 8 is updated and is recorded in the statistics (step 184).

The documentation of a prior collision or of a prior impact or hit becomes relevant in step 160. If a prior hit is determined, according to step 164 the threshold force present at the impact site is to be modified. As a result of the prior hit, it is assumed that the ceramic material has already been weakened at the impact site by microcracks, and insofar a lower value is to be assumed for the threshold force according to step 162.

If it is determined in step 144 according to FIG. 5 that the share of the ceramic object element 5 exceeds the aforementioned limit value, it is necessary according to the causality logic to leave the metallic simulation model, and to switch to the ceramic simulation model. In step 145, it is checked whether the ceramic particle present at the impact site is already embedded into the object 4 as a result of a prior hit. The wording "embed" here shall be understood to mean that the ceramic particle was previously already present at this location and "hammered" deeper into the material of the object 4 by a prior hit.

When such a "hammered-in" embedded particle is present at the impact site, this cannot be driven deeper into the material of the object 4 to absorb the kinetic energy of the individual particle 2, but the ceramic simulation model is used. This means that the kinetic energy of the individual particle 2 results in a destruction of the material at the impact site, wherein this is represented by the model of the crack formation. Accordingly, a transition from step 145 into already known step 164 takes place, and the step as was already described above is followed.

If it is determined, in step 145, that the ceramic particle is not yet embedded, the collision with the individual particle 2 results in deeper embedding according to step 147.

Each of the steps 147 and 174 results in the mass in the mass memory being reorganized according to step 180, and in the control memory being updated according to step 182.

In principle, it applies that, according to one embodiment, the above-described guard/nearest neighbor function can be used during the step 180.

Figure 7A:
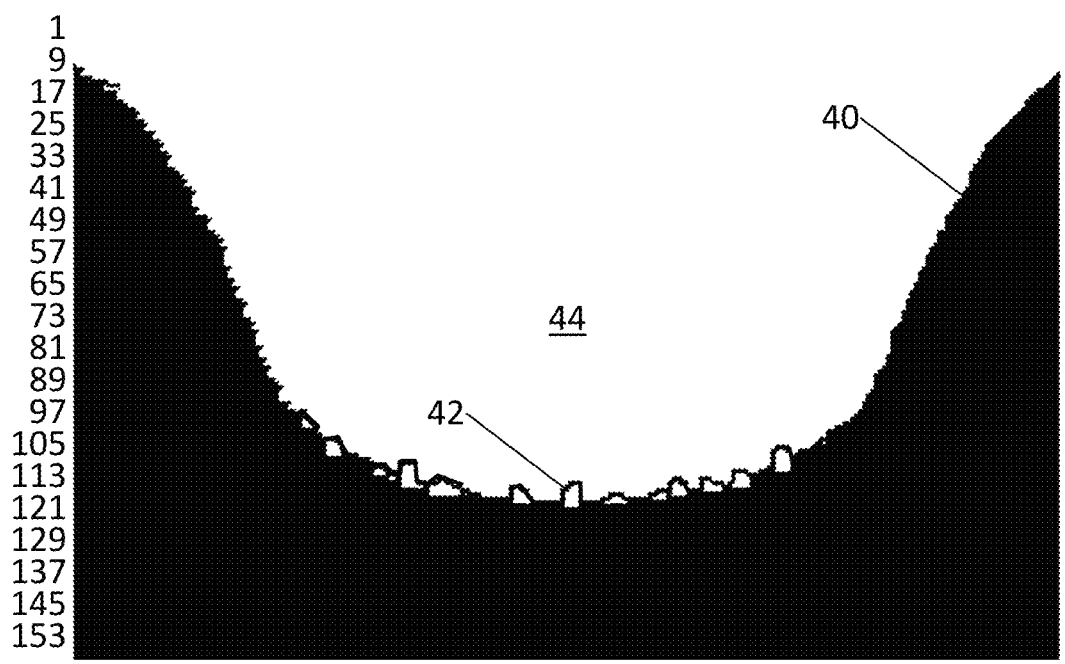
FIGS. 7a and 7b each show a graphical illustration of the simulation result.
Figure 7B:
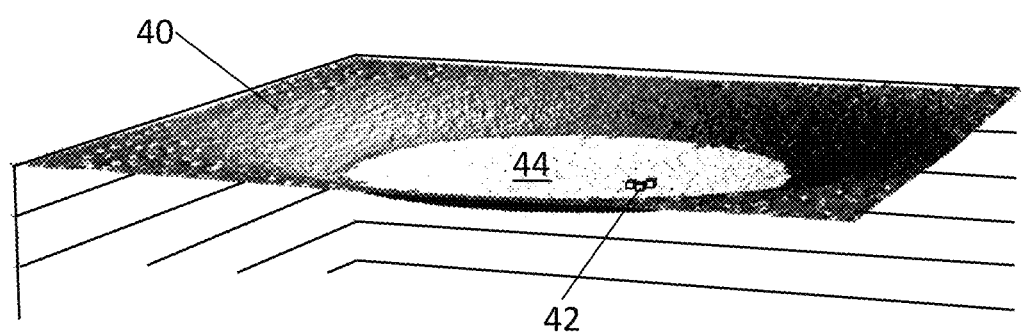

FIGS. 7a and 7b show a visualized result of a run of one embodiment of the simulation method according to the invention. FIG. 7a shows a cross-section through the surface of the object after a simulated collision with 5,000,000 particles 2, with which the surface was bombarded at an average velocity of 200 m/s and which had an average size of 5×3×3 edge lengths. The left scale indicates the volume element planes.

It is evident that the particle bombardment resulted in material removal or in the formation of a crater 44 approximately into plane 120, with particles 42 also adhering to the bottom of the crater 44. FIG. 7b shows a perspective view of the surface 40 of the object 4 and of the crater 44 that is formed.

Even though specific embodiments have been shown and described herein, it is within the scope of the present invention to suitably modify the shown embodiments, without departing from the scope of protection of the present invention. In particular, the content of the non-specific description also applies in connection with the specific description of the figures. This means that, when studying the description of the figures, a person skilled in the art will resort to the disclosure of the entire present document as needed. The following claims represent a first, non-binding attempt to define the invention in general terms.

LIST OF REFERENCE NUMERALS 2 individual particle
4 object
5 object element
6 simulation volume
7 volume element
8 control memory 10 control memory location
12 mass memory
14 mass memory location
16 particle source
18 distribution function
20 particle jet stream
30 aircraft engine
32 (ash) particle
34 turbine blade
40 object surface
42 adhering particle
44 crater
46 impact site
48 impact region

The invention claimed is:

1. A method for simulating an impact of particles or radiation on an object (4), comprising the following steps:
   a) building a simulation volume (6) and the object (4) simulated therein
      by providing a control memory (8) including control memory locations (10) and a mass memory (12) including mass memory locations (14), wherein each mass memory location (14) is assigned a control memory location (10), wherein a mass memory location (14), together with the assigned control memory location (10), describes a particular volume element (7), and wherein the volume elements (7) as a whole form the simulation volume (6); and
      by storing at least one control data value in each control memory location (10) and at least one mass data value in each mass memory location (14), wherein the mass data value represents at least a presence and/or the amount of a mass (16) in the respective volume element (7) so that a volume element (7) thus provided with mass is considered to be an object element (5), wherein the control data value reflects at least one element type, a particular element property and/or an energetic state of a respective volume element (7) or of a respective object element (5), and wherein the object elements (5) as a whole form the simulated object (4) having defined geometric dimensions and defined properties;
   b) building at least one simulated individual particle (2) or an individual radiation unit designated for impacting on the object (4), by determining or querying at least one property and/or an energetic state of the individual particle (2) or of the individual radiation unit;
   c) determining at least one property and/or an energetic state of a particular individual particle (2) or a particular individual radiation unit;
   d) carrying out a simulated interaction of the object (4) with the particular individual particle (2) or with the particular individual radiation unit, caused by collision, using at least in part a distribution function (18) of a present location and/or of a velocity of the particular individual particle (2) or the particular individual radiation unit, in such a way that
      at least one object element (5) hit by the individual particle (2) or by the individual radiation unit, is identified, and
      at least one property and/or an energetic state of the individual particle (2) or of the individual radiation unit is determined or queried during the impact on the object;
   e) determining or querying at least one local property and/or a local energetic state of the affected object element (5) at the impact site (46) and/or of the affected object elements (5) in the impact region (48);
   f) determining or querying a collision event caused by the interaction and acting on the individual particle (2), the individual radiation unit and/or the affected object element (5) or volume element (7), at least based on a calculation of an impact force and/or of a penetration depth of the individual particle (2) or of the individual radiation unit into the object (4);
   g) determining a consequence of the collision event at least on the affected volume element (7) and/or object element (5), by determining the control data value and the corresponding mass data value of the hit object element (5), taking a change of a respective mass, of a respective element property and/or of an energetic state into consideration; and
   h) storing a newly determined or an unchanged control data value in the corresponding control memory location (10) and a newly determined mass data value in the corresponding mass memory location (14).

2. The method according to claim 1, wherein steps d), e), f) and g) are carried out chronologically after steps a) and b), and after c).

3. The method according to claim 1, comprising the following steps:
   i) building a plurality of designated individual particles (2) or individual radiation units during step b);
   j) establishing a simulation goal, by determining a total number of impinging individual particles (2) or individual radiation units, a total mass of individual particles (2), a total radiation dose of the individual radiation units and/or by determining the extent of damage to the object (4) to be achieved by the simulation, wherein the extent of the damage is determined as a loss of mass or a gain of mass and/or a degree of material removal or material deposition of the object (4).

4. The method according to claim 3, comprising the following step:
   k) repeating at least steps c), d), e), f), g) and h) until the simulation goal is achieved.

5. The method according to claim 1, wherein the collision event acting on the individual particle (2), the individual radiation unit and/or the affected object element (5) or volume element (7) includes at least one of at least two elementary events,
   a first elementary event being a removal of mass from a volume element (7), and
   a second elementary event being a change of qualitative element properties of a volume element (7).

6. The method according to claim 1, wherein the collision event acting on the individual particle (2), the individual radiation unit and/or the affected object element or volume element (7) includes at least one of at least three elementary events,
   a first elementary event being a removal of mass from a volume element (7),
   a second elementary event being a change of qualitative element properties of a volume element (7), and
   a third elementary event being an addition of mass to a volume element (7).

7. The method according to claim 1, wherein the collision event acting on the individual particle (2), the individual radiation unit and/or the affected object element or volume element (7) includes at least one of at least four elementary events, a first elementary event being a removal of mass from a volume element (7), a second elementary event being a change of qualitative element properties of a volume element (7), and a third elementary event being an addition of mass to a volume element (7), and a fourth elementary event being a displacement of mass from one volume element (7) to another volume element, and being a combination of the first elementary event and the third elementary event.

8. The method according to claim 1, wherein the object elements (5) as a whole can be represented in the simulation volume by suitably occupying the mass memory locations (14) with mass, which corresponds to a geometric structure, in particular a geometric structure of a base material having a coated surface, a tubular item, a turbine blade or satellite outer shield.

9. The method according to claim 1, wherein a local particle source (16) or radiation unit source is simulated when the simulated interaction is carried out, multiple distribution functions, (18) of an impact site (46) and of a velocity of the individual particle (2) being used superimposed for representing the particle source (16), or multiple distribution functions, and in particular distribution functions of an impact site (46) and of the energy of an individual radiation quantum of the individual radiation unit, being used superimposed for representing the radiation source unit.

10. A non-transitory computer-readable medium, storing a computer program configured to carry out a method according to claim 1, when the computer program is executed on a computer system.

11. The non-transitory computer-readable medium according to claim 10, comprising a sub-program, which is designed to automatically write to the mass memory locations (14) and the control memory locations (10) in such a way that the simulated object (4) composed of object elements (5) is automatically constructed according to a predefined geometric shape having at least one particular property and/or one particular energetic state.

12. The non-transitory computer-readable medium according to claim 10, comprising a sub-program for outputting a state of the geometric structure of the object (4) and/or of a total mass of the object (4).

13. A computer system, comprising a control memory (8) including control memory locations (10), a mass memory (12) including mass memory locations (14), a processing unit for processing data stored in the control memory locations (10) and in the mass memory locations (14), and an input device, the computer system being designed to execute the computer program product according to claim 11.

14. The method according to claim 1, wherein step (b) comprises building a plurality of designated individual particles (2) or individual radiation units.

15. The method according to claim 1, wherein step (c) comprises determining the at least one property and/or an energetic state relative to the object (4) by applying a distribution function of a volume, a present location, a velocity, a temperature, a charge and/or a frequency of the individual particle (2) or the individual radiation unit.

16. The method according to claim 1, wherein step (d) comprises carrying out the simulated interaction in such a way that an impact site (46) and/or an impact region (48) is identified.

17. The method according to claim 1, wherein step (f) is carried out using a stored causality logic.

* * * * *